US012630905B2

(12) United States Patent
Matsunaga et al.

(10) Patent No.: US 12,630,905 B2
(45) **Date of Patent: *May 19, 2026**

(54) COPPER ALLOY, COPPER ALLOY PLASTIC WORKING MATERIAL, COMPONENT FOR ELECTRONIC/ELECTRICAL DEVICES, TERMINAL, BUS BAR, LEAD FRAME AND HEAT DISSIPATION SUBSTRATE

(71) Applicant: MITSUBISHI MATERIALS CORPORATION, Tokyo (JP)

(72) Inventors: Hirotaka Matsunaga, Kitamoto (JP); Kosei Fukuoka, Kitamoto (JP); Kazunari Maki, Kitamoto (JP); Kenji Morikawa, Aizuwakamatsu (JP); Shinichi Funaki, Aizuwakamatsu (JP); Hiroyuki Mori, Sakai (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 503 days.

This patent is subject to a terminal disclaimer.

(21) Appl. No.: 18/002,818

(22) PCT Filed: Jun. 30, 2021

(86) PCT No.: PCT/JP2021/024764
§ 371 (c)(1),
(2) Date: Dec. 21, 2022

(87) PCT Pub. No.: WO2022/004791
PCT Pub. Date: Jan. 6, 2022

(65) Prior Publication Data

US 2023/0243018 A1 Aug. 3, 2023

(30) Foreign Application Priority Data

Jun. 30, 2020 (JP) ................................ 2020-112695
Jun. 30, 2020 (JP) ................................ 2020-112927
Oct. 29, 2020 (JP) ................................ 2020-181734

(51) Int. Cl.
*C22C 9/00* (2006.01)
*C23C 30/00* (2006.01)
*H01B 1/02* (2006.01)

(52) U.S. Cl.
CPC .............. *C22C 9/00* (2013.01); *C23C 30/005* (2013.01); *H01B 1/026* (2013.01)

(58) Field of Classification Search
CPC ......... C22C 9/00; C23C 30/005; H01B 1/026; H01B 5/02; H01B 1/02; C22F 1/08
See application file for complete search history.

(56) References Cited

U.S. PATENT DOCUMENTS 6,251,199 B1 6/2001 Mandigo
11,732,329 B2 * 8/2023 Matsunaga .............. C22F 1/02 420/497

(Continued)

FOREIGN PATENT DOCUMENTS

CN 1876864 A 12/2006
CN 101014725 A 8/2007

(Continued)

OTHER PUBLICATIONS

JP-2014208872-A, machine translation. (Year: 2014).*

(Continued)

*Primary Examiner* — John A Hevey
(74) *Attorney, Agent, or Firm* — Leason Ellis LLP; Melvin C. Garner; Mitsuhiro Haraguchi

(57) ABSTRACT

This copper alloy of one aspect contains greater than 10 mass ppm and less than 100 mass ppm of Mg, with a balance being Cu and inevitable impurities, in which among the inevitable impurities, a S amount is 10 mass ppm or less, a P amount is 10 mass ppm or less, a Se amount is 5 mass ppm or less, a Te amount is 5 mass ppm or less, an Sb amount is (Continued)

5 mass ppm or less, a Bi amount is 5 mass ppm or less, an As amount is 5 mass ppm or less, a total amount of S, P, Se, Te, Sb, Bi, and As is 30 mass ppm or less, a mass ratio [Mg]/[S+P+Se+Te+Sb+Bi+As] is 0.6 to 50, an electrical conductivity is 97% IACS or greater, and a residual stress ratio at 150° C. for 1000 hours is 20% or greater.

12 Claims, 1 Drawing Sheet

(56) References Cited

U.S. PATENT DOCUMENTS

| | | | | |
|---|---|---|---|---|
| 2006/0198757 | A1 | 9/2006 | Hiekkanen et al. | |
| 2009/0084473 | A1 | 4/2009 | Aruga et al. | |
| 2009/0183803 | A1 | 7/2009 | Mutschler | |
| 2018/0187292 | A1* | 7/2018 | Matsunaga | C22C 9/00 |
| 2020/0002787 | A1* | 1/2020 | Fukuoka | H01B 12/10 |
| 2021/0002743 | A1 | 1/2021 | Matsunaga et al. | |
| 2022/0396853 | A1* | 12/2022 | Matsunaga | C22F 1/08 |
| 2023/0243018 | A1 | 8/2023 | Matsunaga et al. | |
| 2023/0243019 | A1* | 8/2023 | Matsunaga | H01B 1/026 148/432 |
| 2023/0313341 | A1* | 10/2023 | Matsunaga | C22C 9/00 420/469 |

FOREIGN PATENT DOCUMENTS

| | | | | |
|---|---|---|---|---|
| CN | 101180412 | A | 5/2008 | |
| CN | 101437969 | A | 5/2009 | |
| CN | 101748309 | A | 6/2010 | |
| CN | 102666888 | A | 9/2012 | |
| CN | 102899518 | A | 1/2013 | |
| CN | 104232979 | A | 12/2014 | |
| CN | 104302794 | A | 1/2015 | |
| CN | 105164292 | A | 12/2015 | |
| CN | 105603242 | A | 5/2016 | |
| CN | 105936982 | A | 9/2016 | |
| CN | 105992831 | A | 10/2016 | |
| CN | 106350696 | A | 1/2017 | |
| CN | 107614714 | A | 1/2018 | |
| CN | 109385556 | A * | 2/2019 | C22F 1/08 |
| EP | 3348656 | A1 | 7/2018 | |
| EP | 4036260 | A1 | 8/2022 | |
| JP | 49015324 | B | 4/1974 | |
| JP | 57089448 | A | 6/1982 | |
| JP | 57094537 | A | 6/1982 | |
| JP | 63310929 | A | 12/1988 | |
| JP | 03072041 | A | 3/1991 | |
| JP | 04280935 | A | 10/1992 | |
| JP | 2001152267 | A | 6/2001 | |
| JP | 2006169548 | A | 6/2006 | |
| JP | 2007113093 | A | 5/2007 | |
| JP | 2007177274 | A | 7/2007 | |
| JP | 2008255416 | A | 10/2008 | |
| JP | 2008255417 | A | 10/2008 | |
| JP | 2010031339 | A | 2/2010 | |
| JP | 4563508 | B | 10/2010 | |
| JP | 2014111810 | A | 6/2014 | |
| JP | 2014208872 | A * | 11/2014 | C22C 9/00 |
| JP | 2015086462 | A | 5/2015 | |
| JP | 2015101773 | A | 6/2015 | |
| JP | 2015187308 | A | 10/2015 | |
| JP | 2016056414 | A * | 4/2016 | |
| JP | 2016125093 | A | 7/2016 | |
| JP | 2017179490 | A | 10/2017 | |
| JP | 2017179493 | A | 10/2017 | |
| JP | 2017186623 | A | 10/2017 | |
| JP | 2018070908 | A | 5/2018 | |
| JP | 2018197397 | A | 12/2018 | |
| JP | 2019029605 | A | 2/2019 | |
| JP | 2019178398 | A | 10/2019 | |
| JP | 2019178399 | A | 10/2019 | |
| TW | 201006940 | A | 2/2010 | |
| TW | 201807209 | A | 3/2018 | |
| WO | 9905331 | A1 | 2/1999 | |
| WO | WO-2017175711 | A1 * | 10/2017 | B22D 11/005 |
| WO | 2019189534 | A1 | 10/2019 | |
| WO | 2019189558 | A1 | 10/2019 | |
| WO | 2020122112 | A1 | 6/2020 | |
| WO | 2021107096 | A1 | 6/2021 | |
| WO | 2021107102 | A1 | 6/2021 | |

OTHER PUBLICATIONS

JP-2016056414-A, machine translation. (Year: 2016).*
CN-109385556-A, machine translation. (Year: 2019).*
U.S. Office Action dated Jul. 1, 2024 for the related U.S. Appl. No. 18/003,398 (22 pages).
Chinese Office Action mailed Dec. 4, 2023 for the related Chinese Patent Application No. 202180045210.0 (8 pages including English translation).
Chinese Office Action mailed Jul. 27, 2023 for the related Chinese Patent Application No. 202180045904.4 (10 pages including English translation).
Chinese Office Action mailed Jul. 28, 2023 for the corresponding Chinese Patent Application No. 202180045132.4 (10 pages including English translation).
Chinese Office Action mailed Jul. 28, 2023 for the related Chinese Patent Application No. 202180046181.X (11 pages including English translation).
Chinese Office Action mailed Aug. 1, 2023 for the related Chinese Patent Application No. 202180045199.8 (8 pages including English translation).
Taiwanese Office Action mailed Aug. 9, 2024 for the corresponding Taiwanese Patent Application No. 110124042 pages including English translation).
Taiwanese Office Action mailed Nov. 5, 2024, for the related Taiwanese Patent Application No. 110124081 (7 pages including English translation).
International Search Report mailed Sep. 21, 2021 for the corresponding PCT International Patent Application No. PCT/JP2021/024764 (5 pages including English translation).
International Search Report mailed Sep. 14, 2021 for the corresponding PCT International Patent Application No. PCT/JP2021/024769 (5 pages including English translation).
International Search Report mailed Sep. 14, 2021 for the corresponding PCT International Patent Application No. PCT/JP2021/024723 (5 pages including English translation).
International Search Report mailed Sep. 21, 2021 for the corresponding PCT International Patent Application No. PCT/JP2021/024762 (5 pages including English translation).
International Search Report mailed Sep. 21, 2021 for the corresponding PCT International Patent Application No. PCT/JP2021/024797 (4 pages including English translation).
International Search Report mailed Feb. 16, 2021 for the related International Patent Application No. PCT/JP2020/044220; 5 pages including English translation.
European Search Report mailed Nov. 17, 2023 for the related European Patent Application No. 20891677.5; 7 pages.
Taiwanese Notice of Allowance mailed Sep. 23, 2024 for the related Taiwanese Patent Application No. 109141689; 4 pages including English translation.
U.S. Restriction Requirement mailed Sep. 11, 2024 for the related U.S. Appl. No. 17/779,394.
U.S. Office Action mailed Dec. 2, 2024 for the related U.S. Appl. No. 17/779,394.
International Search Report mailed Feb. 16, 2021 for the related PCT International Patent Application No. PCT/JP2020/044229, 5 pages including English translation.

* cited by examiner

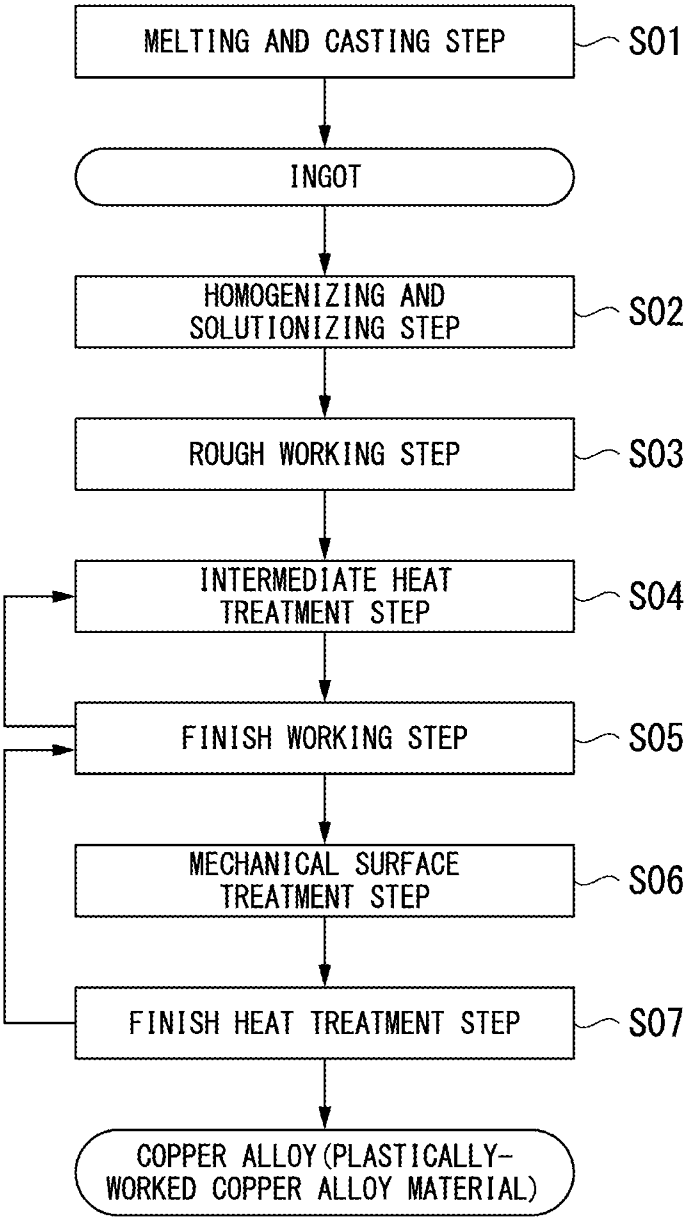
MELTING AND CASTING STEP
S01
INGOT
HOMOGENIZING AND SOLUTIONIZING STEP
S02
ROUGH WORKING STEP
S03
INTERMEDIATE HEAT TREATMENT STEP
S04
FINISH WORKING STEP
S05
MECHANICAL SURFACE TREATMENT STEP
S06
FINISH HEAT TREATMENT STEP
S07
COPPER ALLOY (PLASTICALLY-WORKED COPPER ALLOY MATERIAL)

COPPER ALLOY, COPPER ALLOY PLASTIC WORKING MATERIAL, COMPONENT FOR ELECTRONIC/ELECTRICAL DEVICES, TERMINAL, BUS BAR, LEAD FRAME AND HEAT DISSIPATION SUBSTRATE

CROSS-REFERENCE TO RELATED PATENT APPLICATIONS

This application is a U.S. National Phase Application under 35 U.S.C. § 371 of International Patent Application No. PCT/JP2021/024764 filed on Jun. 30, 2021 and claims the benefit of priority to Japanese Patent Applications No. 2020-112695 filed on Jun. 30, 2020, No. 2020-112927 filed on Jun. 30, 2020 and No. 2020-181734 filed on Oct. 29, 2020, the contents of all of which are incorporated herein by reference in their entireties. The International Application was published in Japanese on Jan. 6, 2022 as International Publication No. WO/2022/004791 under PCT Article 21(2).

FIELD OF THE INVENTION

The present invention relates to a copper alloy suitable for a component for electronic/electrical devices such as a terminal, a bus bar, a lead frame, a heat dissipation member, a heat dissipation substrate, and the like; a plastically-worked copper alloy material: a component for electronic/electrical devices; a terminal: a bus bar; a lead frame; and a heat dissipation substrate, which include this copper alloy.

BACKGROUND OF THE INVENTION

In the related art, as a component for electronic/electrical devices such as a terminal, a bus bar, a lead frame, a heat dissipation member, or a heat dissipation substrate, copper or a copper alloy with excellent electrical conductivity has been used.

With an increase in current of electronic devices and electrical devices, in order to reduce the current density and diffuse heat due to Joule heat generation, an increase in size and an increase in thickness of a component for electronic/electrical devices used for such electronic devices and electrical devices have been attempted.

In order to deal with a high current, a pure copper material such as oxygen-free copper having excellent electrical conductivity is applied to the component for electronic/electrical devices described above. However, the pure copper material has a problem in that the material cannot be used in a high-temperature environment because of degraded stress relaxation resistance reflecting the degree of settling of a spring due to heat or insufficient stress relaxation resistance. Therefore, Japanese Unexamined Patent Application, First Publication No. 2016-056414 discloses a rolled copper plate containing 0.005% by mass or greater and less than 0.1% by mass of Mg.

The rolled copper plate described in Japanese Unexamined Patent Application, First Publication No. 2016-056414 has a composition including 0.005% by mass or greater and less than 0.1% by mass of Mg with the balance being Cu and inevitable impurities, and thus the strength and the stress relaxation resistance can be improved without greatly decreasing the electrical conductivity by dissolving Mg in a Cu matrix.

Meanwhile, recently, a copper material constituting the component for electronic/electrical devices is required to further improve the electrical conductivity in order to use the copper material for applications where the pure copper material has been used, and in order to sufficiently suppress heat generation in a case where a high current flows.

Further, since the above-described component for electronic/electrical devices is likely to be used in a high-temperature environment such as an engine room, the copper material constituting the component for electronic/electrical devices is required to improve the stress relaxation resistance more than before. In other words, there is a demand for a copper material with improved electrical conductivity and stress relaxation resistance in a well-balanced manner.

Further, in the case where the electrical conductivity is sufficiently improved, the copper material can be satisfactorily used even in the applications where a pure copper material has been used in the related art.

PRIOR ART DOCUMENTS

Patent Document

Patent Document 1: Japanese Unexamined Patent Application, First Publication No. 2016-056414

Problems to be Solved by the Invention

The present invention has been made in view of the above-described circumstances, and an object thereof is to provide a copper alloy, a plastically-worked copper alloy material, a component for electronic/electrical devices, a terminal, a bus bar, a lead frame, and a heat dissipation substrate, which have high electrical conductivity and excellent stress relaxation resistance.

SUMMARY OF THE INVENTION

Solutions for Solving the Problems

As a result of intensive research conducted by the present inventors in order to achieve the above-described object, it was found that addition of a small amount of Mg and regulation of the amount of an element generating a compound with Mg are required to achieve the balance between the high electrical conductivity and the excellent stress relaxation resistance. That is, it was found that the electrical conductivity and the stress relaxation resistance can be further improved more than before in a well-balanced manner by regulating the amount of an element generating a compound with Mg and allowing the small amount of Mg that has been added to be present in the copper alloy in an appropriate form.

The present invention has been made based on the above-described findings.

According to a first aspect of the present invention, there is provided a copper alloy having a composition including Mg in an amount of greater than 10 mass ppm and less than 100 mass ppm, with a balance being Cu and inevitable impurities, in which among the inevitable impurities, an amount of S is 10 mass ppm or less, an amount of P is 10 mass ppm or less, an amount of Se is 5 mass ppm or less, an amount of Te is 5 mass ppm or less, an amount of Sb is 5 mass ppm or less, an amount of Bi is 5 mass ppm or less, and an amount of As is 5 mass ppm or less, and a total amount of S, P, Se, Te, Sb, Bi, and As is 30 mass ppm or less, and when the amount of Mg is represented as [Mg] and the total amount of S, P, Se, Te, Sb, Bi, and As is represented as [S+P+Se+Te+Sb+Bi+As], a mass ratio thereof, [Mg]/[S+P+Se+Te+Sb+Bi+As] is 0.6 or greater and 50 or less, an electrical conductivity is 97% IACS or greater, and a residual stress ratio in a direction parallel to a rolling direction at 150° C. for 1000 hours is 20% or greater.

According to the copper alloy with the above-described configuration, since the amount of Mg and the amounts of S, P, Se, Te, Sb, Bi, and As, which are elements generating compounds with Mg, are defined as described above, the stress relaxation resistance can be improved without greatly decreasing the electrical conductivity by dissolving a small amount of added Mg in a Cu matrix, specifically, the electrical conductivity can be set to 97% IACS or greater, the residual stress ratio in a direction parallel to a rolling direction at 150° C. for 1000 hours can be set to 20% or greater, and both high electrical conductivity and excellent stress relaxation resistance can be achieved.

Further, in the copper alloy according to the first aspect of the present invention, it is preferable that an amount of Ag is 5 mass ppm or greater and 20 mass ppm or less. In this case, since the amount of Ag is in the above-described range, Ag is segregated in the vicinity of grain boundaries, grain boundary diffusion is suppressed, and the stress relaxation resistance can be further improved.

Further, in the copper alloy according to the first aspect of the present invention, it is preferable that, among the inevitable impurities, an amount of H is 10 mass ppm or less, an amount of O is 100 mass ppm or less, and an amount of C is 10 mass ppm or less. In this case, since the amounts of H, O, and C are defined as described above, generation of defects such as blowholes, Mg oxides, C inclusions, and carbides can be reduced, and the stress relaxation resistance can be improved without decreasing the workability.

Further, in the copper alloy according to the first aspect of the present invention, it is preferable that a half-softening temperature is 200° C. or higher.

In this case, since the half-softening temperature is set to 200° C. or higher, the heat resistance is sufficiently excellent, and the copper alloy can be stably used even in a high-temperature environment.

In the copper alloy according to the first aspect of the present invention, in a case where the copper alloy is measured by an EBSD method in a measurement area of 10000 $\mu m^2$ or greater at every measurement interval of 0.25 μm, measured results are analyzed by data analysis software OIM to obtain a CI value at each measurement point, a measurement point at which the CI value is 0.1 or less is removed, an orientation difference between crystal grains is analyzed, a boundary having 15° or greater of an orientation difference between neighboring measurement points is assigned as a crystal grain boundary, an average grain size A is acquired according to Area Fraction, the copper alloy is measured by the EBSD method at every measurement interval which is 1/10 or less of the average grain size A, measured results are analyzed by the data analysis software OIM with a total area of 10000 $\mu m^2$ or greater in a plurality of visual fields such that a total of 1000 or more crystal grains are included to obtain a CI value at each measurement point, a measurement point at which the CI value is 0.1 or less is removed, an orientation difference between crystal grains is analyzed, and a boundary having 5° or greater of an orientation difference between neighboring pixels is assigned as a crystal grain boundary, it is preferable that an average value of Kernel Average Misorientation (KAM) values is 2.4 or less.

Since the average value of the KAM values is set to 2.4 or less, the stress relaxation resistance can be improved while the strength is maintained.

A plastically-worked copper alloy material according to the first aspect of the present invention includes the copper alloy according to the first aspect described above.

According to the plastically-worked copper alloy material with the above-described configuration, since the plastically-worked copper alloy material includes the above-described copper alloy, the plastically-worked copper alloy material has excellent electrical conductivity and excellent stress relaxation resistance, and thus is particularly suitable as a material of a component for electronic/electrical devices, such as a terminal, a bus bar, a lead frame, or a heat dissipation member (heat dissipation substrate), used for high-current applications in a high-temperature environment.

The plastically-worked copper alloy material according to the first aspect of the present invention may be a rolled plate having a thickness of 0.1 mm or greater and 10 mm or less.

In this case, since the plastically-worked copper alloy material is a rolled plate having a thickness of 0.1 mm or greater and 10 mm or less, a component for electronic/electrical devices, such as a terminal, a bus bar, a lead frame, or a heat dissipation member, can be molded by subjecting the plastically-worked copper alloy material (rolled plate) to punching or bending.

It is preferable that the plastically-worked copper alloy material according to the first aspect of the present invention includes a Sn plating layer or an Ag plating layer on a surface thereof.

That is, it is preferable that the plastically-worked copper alloy material according to the first aspect includes a main body of the plastically-worked copper alloy material and a Sn plating layer or Ag plating layer provided on the surface of the main body. The main body may be a rolled plate consisting of the copper alloy according to the first aspect described above and having a thickness of 0.1 mm or greater and 10 mm or less. In this case, since the plastically-worked copper alloy material includes a Sn plating layer or an Ag plating layer on the surface thereof, the plastically-worked copper alloy material is particularly suitable as a material of a component for electronic/electrical devices, such as a terminal, a bus bar, a lead frame, or a heat dissipation member. Further, according to the first aspect of the present invention, the concept of “Sn plating” includes pure Sn plating or Sn alloy plating, and the concept of “Ag plating” includes pure Ag plating or Ag alloy plating.

A component for electronic/electrical devices according to the first aspect of the present invention includes the plastically-worked copper alloy material according to the first aspect described above. Further, examples of the component for electronic/electrical devices according to the first aspect of the present invention include a terminal, a bus bar, a lead frame, a heat dissipation member, and the like.

The component for electronic/electrical devices with the above-described configuration is produced by using the above-described plastically-worked copper alloy material, and thus the component can exhibit excellent characteristics even in a case of being used for high-current applications in a high-temperature environment.

A terminal according to the first aspect of the present invention includes the plastically-worked copper alloy material according to the first aspect described above. The terminal with the above-described configuration is produced by using the plastically-worked copper alloy material described above, and thus the terminal can exhibit excellent characteristics even in a case of being used for high-current applications in a high-temperature environment.

A bus bar according to the first aspect of the present invention includes the plastically-worked copper alloy material according to the first aspect described above.

The bus bar with the above-described configuration is produced by using the plastically-worked copper alloy material described above, and thus the bus bar can exhibit excellent characteristics even in a case of being used for high-current applications in a high-temperature environment.

A lead frame according to the first aspect of the present invention includes the plastically-worked copper alloy material according to the first aspect described above.

The lead frame with the above-described configuration is produced by using the plastically-worked copper alloy material described above, and thus the lead frame can exhibit excellent characteristics even in a case of being used for high-current applications in a high-temperature environment.

A heat dissipation substrate according to the first aspect of the present invention is prepared by using the copper alloy according to the first aspect described above.

The heat dissipation substrate with the above-described configuration is prepared by using the copper alloy described above, and thus the heat dissipation substrate can exhibit excellent characteristics even in a case of being used for high-current applications in a high-temperature environment.

According to a second aspect of the present invention, there is provided a copper alloy having a composition including Mg in an amount of greater than 10 mass ppm and less than 100 mass ppm, with a balance being Cu and inevitable impurities, in which among the inevitable impurities, an amount of S is 10 mass ppm or less, an amount of P is 10 mass ppm or less, an amount of Se is 5 mass ppm or less, an amount of Te is 5 mass ppm or less, an amount of Sb is 5 mass ppm or less, an amount of Bi is 5 mass ppm or less, and an amount of As is 5 mass ppm or less, and a total amount of S, P, Se, Te, Sb, Bi, and As is 30 mass ppm or less, when the amount of Mg is represented as [Mg] and the total amount of S, P, Se, Te, Sb, Bi, and As is represented as [S+P+Se+Te+Sb+Bi+As], a mass ratio thereof, [Mg]/[S+P+Se+Te+Sb+Bi+As] is 0.6 or greater and 50 or less, an electrical conductivity is 97% IACS or greater, and in a case where the copper alloy is measured by an EBSD method in a measurement area of 10000 $\mu m^2$ or greater at every measurement interval of 0.25 μm, measured results are analyzed by data analysis software OIM to obtain a CI value at each measurement point, a measurement point at which the CI value is 0.1 or less is removed, an orientation difference between crystal grains is analyzed, a boundary having 15° or greater of an orientation difference between neighboring measurement points is assigned as a crystal grain boundary, an average grain size A is acquired according to Area Fraction, the copper alloy is measured by the EBSD method at every measurement interval which is 1/10 or less of the average grain size A, measured results are analyzed by the data analysis software OIM with a total area of 10000 $\mu m^2$ or greater in a plurality of visual fields such that a total of 1000 or more crystal grains are included to obtain a CI value at each measurement point, a measurement point at which the CI value is 0.1 or less is removed, an orientation difference between crystal grains is analyzed, and a boundary having 5° or greater of an orientation difference between neighboring pixels is assigned as a crystal grain boundary, an average value of Kernel Average Misorientation (KAM) values is 2.4 or less.

According to the copper alloy with the above-described configuration, since the amount of Mg and the amounts of S, P, Se, Te, Sb, Bi, and As, which are elements generating compounds with Mg, are defined as described above, the stress relaxation resistance can be improved without greatly decreasing the electrical conductivity by dissolving a small amount of added Mg in a Cu matrix, and specifically, the electrical conductivity can be set to 97% IACS or greater.

Further, since the average value of the KAM values is set to 2.4 or less, the stress relaxation resistance can be improved while the strength is maintained.

Further, in the copper alloy according to the second aspect of the present invention, it is preferable that an amount of Ag is 5 mass ppm or greater and 20 mass ppm or less.

In this case, since the amount of Ag is in the above-described range, Ag is segregated in the vicinity of grain boundaries, grain boundary diffusion is suppressed, and the stress relaxation resistance can be further improved.

In addition, in the copper alloy according to the second aspect of the present invention, it is preferable that a residual stress ratio RSG (%) in a direction parallel to a rolling direction after holding at 200° C. for 4 hours is 20% or greater.

In this case, the copper alloy has sufficiently excellent stress relaxation resistance, and thus is particularly suitable as a copper alloy constituting a component for electronic/electrical devices used in a high-temperature environment.

A plastically-worked copper alloy material according to the second aspect of the present invention includes the copper alloy according to the second aspect described above.

According to the plastically-worked copper alloy material with the above-described configuration, since the plastically-worked copper alloy material includes the above-described copper alloy, the plastically-worked copper alloy material has excellent electrical conductivity and excellent stress relaxation resistance, and thus is particularly suitable as a material of a component for electronic/electrical devices, such as a terminal, a bus bar, a lead frame, or a heat dissipation substrate, used for high-current applications in a high-temperature environment.

The plastically-worked copper alloy material according to the second aspect of the present invention may be a rolled plate having a thickness of 0.1 mm or greater and 10 mm or less.

In this case, since the plastically-worked copper alloy material is a rolled plate having a thickness of 0.1 mm or greater and 10 mm or less, a component for electronic/electrical devices, such as a terminal, a bus bar, a lead frame, or a heat dissipation substrate, can be molded by subjecting the plastically-worked copper alloy material (rolled plate) to punching or bending.

Further, it is preferable that the plastically-worked copper alloy material according to the second aspect of the present invention includes a Sn plating layer or Ag plating layer on the surface thereof.

That is, it is preferable that the plastically-worked copper alloy material according to the second aspect includes a main body of the plastically-worked copper alloy material and a Sn plating layer or Ag plating layer provided on the surface of the main body. The main body may be a rolled plate consisting of the copper alloy according to the second aspect described above and having a thickness of 0.1 mm or greater and 10 mm or less. In this case, since the plastically-worked copper alloy material includes a Sn plating layer or an Ag plating layer on the surface thereof, the plastically-worked copper alloy material is particularly suitable as a material of a component for electronic/electrical devices, such as a terminal, a bus bar, a lead frame, or a heat dissipation substrate. Further, according to the second aspect of the present invention, the concept of "Sn plating" includes pure Sn plating or Sn alloy plating and the concept of "Ag plating" includes pure Ag plating or Ag alloy plating.

A component for electronic/electrical devices according to the second aspect of the present invention includes the plastically-worked copper alloy material according to the second aspect described above. Further, examples of the component for electronic/electrical devices according to the second aspect of the present invention include a terminal, a bus bar, a lead frame, and a heat dissipation substrate.

The component for electronic/electrical devices with the above-described configuration is produced by using the above-described plastically-worked copper alloy material, and thus the component can exhibit excellent characteristics even in a case of being used for high-current applications in a high-temperature environment.

A terminal according to the second aspect of the present invention includes the plastically-worked copper alloy material according to the second aspect described above. The terminal with the above-described configuration is produced by using the plastically-worked copper alloy material described above, and thus the terminal can exhibit excellent characteristics even in a case of being used for high-current applications in a high-temperature environment.

A bus bar according to the second aspect of the present invention includes the plastically-worked copper alloy material according to the second aspect described above. The bus bar with the above-described configuration is produced by using the plastically-worked copper alloy material described above, and thus the bus bar can exhibit excellent characteristics even in a case of being used for high-current applications in a high-temperature environment.

A lead frame according to the second aspect of the present invention includes the plastically-worked copper alloy material according to the second aspect described above. The lead frame with the above-described configuration is produced by using the plastically-worked copper alloy material described above, and thus the lead frame can exhibit excellent characteristics even in a case of being used for high-current applications in a high-temperature environment.

A heat dissipation substrate according to the second aspect of the present invention is prepared by using the copper alloy according to the second aspect described above.

The heat dissipation substrate with the above-described configuration is prepared by using the copper alloy described above, and thus the heat dissipation substrate can exhibit excellent characteristics even in a case of being used for high-current applications in a high-temperature environment.

Effects of Invention

According to the first and second aspects of the present invention, it is possible to provide a copper alloy, a plastically-worked copper alloy material, a component for electronic/electrical devices, a terminal, a bus bar, a lead frame, and a heat dissipation substrate, which have high electrical conductivity and excellent stress relaxation resistance.

BRIEF DESCRIPTION OF THE DRAWINGS

The FIGURE is a flow chart showing a method for producing a copper alloy according to the present embodiment.

DETAILED DESCRIPTION OF THE INVENTION

First Embodiment

Hereinafter, a copper alloy according to an embodiment of the present invention will be described.

The copper alloy according to the present embodiment is a copper alloy which has a composition including Mg in an amount of greater than 10 mass ppm and less than 100 mass ppm, with a balance being Cu and inevitable impurities, in which among the inevitable impurities, the amount of S is 10 mass ppm or less, the amount of P is 10 mass ppm or less, the amount of Se is 5 mass ppm or less, the amount of Te is 5 mass ppm or less, the amount of Sb is 5 mass ppm or less, the amount of Bi is 5 mass ppm or less, and the amount of As is 5 mass ppm or less, and the total amount of S, P, Se, Te, Sb, Bi, and As is 30 mass ppm or less.

Further, when the amount of Mg is represented as [Mg] and the total amount of S, P, Se, Te, Sb, Bi, and As is represented as [S+P+Se+Te+Sb+Bi+As], the mass ratio thereof, [Mg]/[S+P+Se+Te+Sb+Bi+As] is 0.6 or greater and 50 or less.

Further, in the copper alloy according to the present embodiment, the amount of Ag may be 5 mass ppm or greater and 20 mass ppm or less.

Further, in the copper alloy according to the present embodiment, among the inevitable impurities, the amount of H may be 10 mass ppm or less, the amount of O may be 100 mass ppm or less, and the amount of C may be 10 mass ppm or less.

In the copper alloy according to the present embodiment, the electrical conductivity is 97% IACS or greater, and the residual stress ratio in a direction parallel to a rolling direction at 150° C. for 1000 hours is 20% or greater.

Further, in the copper alloy according to the present embodiment, the half-softening temperature is preferably 200° C. or higher.

In the copper alloy according to the present embodiment, the reasons for specifying the component composition and various characteristics as described above will be described below.

(Mg)

Mg is an element having an effect of improving the stress relaxation resistance without greatly decreasing the electrical conductivity by being dissolved in a Cu matrix. Further, in a case where Mg is dissolved in the matrix, the half-softening temperature is improved, and the heat resistance is improved.

In a case where the amount of Mg is 10 mass ppm or less, there is a concern that the effect may not be sufficiently exhibited. On the contrary, in a case where the amount of Mg is 100 mass ppm or greater, the electrical conductivity may be decreased. As described above, in the present embodiment, the amount of Mg is set to be in a range of greater than 10 mass ppm and less than 100 mass ppm.

Further, in order to further improve the stress relaxation resistance, the lower limit of the amount of Mg is preferably 20 mass ppm or greater, more preferably 30 mass ppm or greater, and still more preferably 40 mass ppm or greater.

Further, in order to further increase the electrical conductivity, the upper limit of the amount of Mg is preferably less than 90 mass ppm. In a case where the electrical conductivity is increased, the upper limit of the amount of Mg is more preferably less than 80 mass ppm and more preferably less than 70 mass ppm in order to achieve the balance between the electrical conductivity, the heat resistance, and the stress relaxation characteristic.

(S, P, Se, Te, Sb, Bi, and As)

The elements such as S, P, Se, Te, Sb, Bi, and As described above are elements that are typically easily mixed into a copper alloy. These elements are likely to react with Mg to form a compound, and thus may reduce the solid-solution effect of a small amount of added Mg. Therefore, the amounts of these elements are required to be strictly controlled.

Therefore, in the present embodiment, the amount of S is limited to 10 mass ppm or less, the amount of P is limited to 10 mass ppm or less, the amount of Se is limited to 5 mass ppm or less, the amount of Te is limited to 5 mass ppm or less, the amount of Sb is limited to 5 mass ppm or less, the amount of Bi is limited to 5 mass ppm or less, and the amount of As is limited to 5 mass ppm or less.

Further, the total amount of S, P, Se, Te, Sb, Bi, and As is limited to 30 mass ppm or less.

The lower limits of the amounts of the above-described elements are not particularly limited, but the amount of each of S, P, Sb, Bi, and As is preferably 0.1 mass ppm or greater, the amount of Se is preferably 0.05 mass ppm or greater, and the amount of Te is preferably 0.01 mass ppm or greater from the viewpoint that the production cost is increased in order to greatly reduce the amounts of the above-described elements.

The lower limit of the total amount of S, P, Se, Te, Sb, Bi, and As is not particularly limited, but the total amount of S, P, Se, Te, Sb, Bi, and As is preferably 0.6 mass ppm or greater from the viewpoint that the production cost is increased in order to greatly reduce the total amount thereof.

Further, the amount of S is preferably 9 mass ppm or less and more preferably 8 mass ppm or less.

The amount of P is preferably 6 mass ppm or less and more preferably 3 mass ppm or less.

The amount of Se is preferably 4 mass ppm or less and more preferably 2 mass ppm or less.

The amount of Te is preferably 4 mass ppm or less and more preferably 2 mass ppm or less.

The amount of Sb is preferably 4 mass ppm or less and more preferably 2 mass ppm or less.

The amount of Bi is preferably 4 mass ppm or less and more preferably 2 mass ppm or less.

The amount of As is preferably 4 mass ppm or less and more preferably 2 mass ppm or less.

Further, the total amount of S, P, Se, Te, Sb, Bi, and As is preferably 24 mass ppm or less and more preferably 18 mass ppm or less.

([Mg]/[S+P+Se+Te+Sb+Bi+As])

As described above, since elements such as S, P, Se, Te, Sb, Bi, and As easily react with Mg to form compounds, the existence form of Mg is controlled by defining the ratio between the amount of Mg and the total amount of S, P, Se, Te, Sb, Bi, and As in the present embodiment.

When the amount of Mg is represented as [Mg] and the total amount of S, P, Se, Te, Sb, Bi, and As is represented as [S+P+Se+Te+Sb+Bi+As], in a case where the mass ratio thereof [Mg]/[S+P+Se+Te+Sb+Bi+As] is greater than 50, Mg is excessively present in copper in a solid solution state, and thus the electrical conductivity may be decreased. On the contrary, in a case where the mass ratio thereof [Mg]/[S+P+Se+Te+Sb+Bi+As] is less than 0.6, Mg is not sufficiently dissolved in copper, and thus the stress relaxation resistance may not be sufficiently improved.

Therefore, in the present embodiment, the mass ratio [Mg]/[S+P+Se+Te+Sb +Bi+As] is set to be in a range of 0.6 or greater and 50 or less.

In addition, the amount of each element in the above-described mass ratio is in units of mass ppm.

In order to further increase the electrical conductivity, the upper limit of the mass ratio [Mg]/[S+P+Se+Te+Sb+Bi+As] is set to preferably 35 or less and more preferably 25 or less.

Further, in order to further improve the stress relaxation resistance, the lower limit of the mass ratio [Mg]/[S+P+Se+Te+Sb+Bi+As] is set to preferably 0.8 or greater and more preferably 1.0 or greater.

(Ag: 5 Mass Ppm or Greater and 20 Mass Ppm or Less)

Ag is unlikely to be dissolved in the Cu matrix in a temperature range of 250° C. or lower, in which typical electronic/electrical devices are used. Therefore, a small amount of Ag added to copper segregates in the vicinity of grain boundaries. In this manner, since movement of atoms at grain boundaries is hindered and grain boundary diffusion is suppressed, the stress relaxation resistance is improved.

In a case where the amount of Ag is 5 mass ppm or greater, the effects can be sufficiently exhibited. On the contrary, in a case where the amount of Ag is 20 mass ppm or less, the electrical conductivity can be ensured and an increase in production cost can be suppressed.

As described above, in the present embodiment, the amount of Ag is set to be in a range of 5 mass ppm or greater and 20 mass ppm or less.

In order to further improve the stress relaxation resistance, the lower limit of the amount of Ag is set to preferably 6 mass ppm or greater, more preferably 7 mass ppm or greater, and still more preferably 8 mass ppm or greater. Further, in order to reliably suppress a decrease in the electrical conductivity and an increase in cost, the upper limit of the amount of Ag is set to preferably 18 mass ppm or less, more preferably 16 mass ppm or less, and still more preferably 14 mass ppm or less.

In a case where Ag is not intentionally included and the inevitable impurities include Ag, the amount of Ag may be less than 5 mass ppm.

(H: 10 Mass Ppm or Less)

H is an element that combines with O to form water vapor in a case of casting and causes blowhole defects in an ingot. The blowhole defects cause defects such as cracking in a case of casting and blistering and peeling in a case of rolling. The defects such as cracking, blistering, and peelings are known to degrade the strength and the stress corrosion cracking resistance because the defects are the starting point of fractures due to stress concentration.

The occurrence of blowhole defects described above is suppressed by setting the amount of H to 10 mass ppm or less, and deterioration of cold workability can be suppressed.

In order to further suppress the occurrence of blowhole defects, the amount of H is set to preferably 4 mass ppm or less and more preferably 2 mass ppm or less.

The lower limit of the amount of H is not particularly limited, but the amount of H is preferably 0.01 mass ppm or greater from the viewpoint that the production cost is increased in order to greatly reduce the amount of H.

(O: 100 Mass Ppm or Less)

O is an element that reacts with each component element in the copper alloy to form an oxide. Since such oxides serve as the starting point for fractures, workability is degraded; and thereby, it becomes difficult to manufacture the copper alloy. Further, in a case where an excessive amount of O reacts with Mg, Mg is consumed, the amount of solid solution of Mg in the Cu matrix is decreased, and thus the cold workability may be degraded.

The generation of oxides and the consumption of Mg are suppressed by setting the amount of O to 100 mass ppm or less, and thus the workability can be improved.

Further, the amount of O is particularly preferably 50 mass ppm or less and more preferably 20 mass ppm or less, even within the above-described range.

The lower limit of the amount of O is not particularly limited, but the amount of O is preferably 0.01 mass ppm or greater from the viewpoint that the production cost is increased in order to greatly reduce the amount of O.

(C: 10 Mass Ppm or Less)

C is an element that is used to coat the surface of a molten metal in a case of melting and casting for the purpose of deoxidizing the molten metal and thus may inevitably be mixed. In a case where the amount of C increases, C inclusion during casting increases. The segregation of C, a composite carbide, and a solid solution of C degrades the cold workability.

In a case where the amount of C is set to 10 mass ppm or less, occurrence of segregation of C, a composite carbide, and a solid solution of C can be suppressed, and cold workability can be improved.

Further, the amount of C is preferably 5 mass ppm or less and more preferably 1 mass ppm or less, even within the above-described range.

The lower limit of the amount of C is not particularly limited, but the amount of C is preferably 0.01 mass ppm or greater from the viewpoint that the production cost is increased in order to greatly reduce the amount of C.

(Other Inevitable Impurities)

Examples of other inevitable impurities other than the above-described elements include Al, B, Ba, Be, Ca, Cd, Cr, Sc, rare earth elements, V, Nb, Ta, Mo, Ni, W, Mn, Re, Ru, Sr, Ti, Os, Co, Rh, Ir, Pb, Pd, Pt, Au, Zn, Zr, Hf, Hg, Ga, In, Ge, Y, TI, N, Si, Sn, and Li. The copper alloy may contain inevitable impurities within a range not affecting the characteristics.

Since there is a concern that the electrical conductivity is decreased, it is preferable that the amount of the inevitable impurities is reduced.

(Electrical Conductivity: 97% IACS or Greater)

In the copper alloy according to the present embodiment, the electrical conductivity is 97% IACS or greater. The heat generation in a case of electrical conduction is suppressed by setting the electrical conductivity to 97% IACS or greater so that the copper alloy can be satisfactorily used as a component for electronic/electrical devices such as a terminal, a bus bar, a lead frame, or a heat dissipation member as a substitute to a pure copper material.

The electrical conductivity is preferably 97.5% IACS or greater, more preferably 98.0% IACS or greater, still more preferably 98.5% IACS or greater, and even still more preferably 99.0% IACS or greater.

The upper limit of the electrical conductivity is not particularly limited, but is preferably 103.0% IACS or less.

(Residual Stress Ratio (150° C., 1000 Hours): 20% or Greater)

In the copper alloy according to the present embodiment, the residual stress ratio in a direction parallel to a rolling direction at 150° C. for 1000 hours is 20% or greater. That is, the residual stress ratio after holding at 150° C. for 1000 hours is 20% or greater. In a case where the residual stress ratio under the above-described conditions is high, permanent deformation can be suppressed to be small in a case of being used in a high-temperature environment, and a decrease in contact pressure can be suppressed.

Therefore, the rolled copper plate according to the present embodiment can be applied as a terminal to be used in a high-temperature environment such as the periphery of an engine room of an automobile.

In addition, the residual stress ratio in a direction parallel to the rolling direction at 150° C. for 1000 hours is set to preferably 30% or greater, more preferably 40% or greater, and still more preferably 50% or greater.

The upper limit of the residual stress ratio in a direction parallel to the rolling direction is not particularly limited, but is preferably 95% or less.

(Half-Softening Temperature: 200° C. Or Higher)

In a case where the half-softening temperature is high, recovery in the copper material and softening phenomenon due to recrystallization are unlikely to occur even at a high temperature; and therefore, the copper alloy according to the present embodiment can be applied to an electric conductive member used in a high-temperature environment.

Therefore, in the present embodiment, the half-softening temperature in the heat treatment for 1 hour is set to preferably 200° C. or higher. In the present embodiment, the half-softening temperature is evaluated by measuring Vickers hardness.

Further, the half-softening temperature in the heat treatment for 1 hour is more preferably 225° C. or higher, still more preferably 250° C. or higher, and even still more preferably 275° C. or higher.

The upper limit of the half-softening temperature is not particularly limited, but is preferably 600° C. or lower.

(Average Value of KAM Values: 2.4 or Less)

The details of the average value of the KAM values will be described in a second embodiment. As in the second embodiment, the average value of the KAM values is preferably 2.4 or less. The average value of the KAM values is preferably 2.2 or less, more preferably 2.0 or less, still more preferably 1.8 or less, and even still more preferably 1.6 or less. The average value of the KAM values is preferably 0.2 or greater, more preferably 0.4 or greater, still more preferably 0.6 or greater, and most preferably 0.8 or greater.

Next, a method for producing the copper alloy according to the present embodiment with such a configuration will be described with reference to the flow chart shown in the drawing.

(Melting and Casting Step S01)

First, the above-described elements are added to molten copper obtained by melting the copper raw material to adjust components; and thereby, a molten copper alloy is produced. Further, a single element, a base alloy, or the like can be used for addition of various elements. In addition, raw materials containing the above-described elements may be melted together with the copper raw material. Further, a recycled material or a scrap material of the copper alloy of the present embodiment may be used.

As the copper raw material, so-called 4N Cu having a purity of 99.99% by mass or greater or so-called 5N Cu having a purity of 99.999% by mass or greater is preferably used. In a case where the amounts of H, O, and C are defined as described above, raw material with low amounts of these elements is selected and used. Specifically, it is preferable to use a raw material having a H amount of 0.5 mass ppm or less, an O amount of 2.0 mass ppm or less, and a C amount of 1.0 mass ppm or less.

During melting, in order to suppress oxidation of Mg and to reduce the hydrogen concentration, it is preferable that the melting is carried out in an atmosphere using an inert gas atmosphere (for example, Ar gas) in which the vapor pressure of $H_2O$ is low and the holding time for the melting is set to the minimum.

Then, the molten copper alloy in which the components have been adjusted is poured into a mold to produce an ingot. In consideration of mass production, it is preferable to use a continuous casting method or a semi-continuous casting method.

(Homogenizing/Solutionizing Step S02)

Next, a heat treatment is performed for homogenization and solutionization of the obtained ingot. An intermetallic compound or the like containing Cu and Mg as main components may be present inside the ingot, and the intermetallic compound is generated by segregation and concentration of Mg in the solidification process. Therefore, in order to eliminate or reduce the segregated elements and the intermetallic compound, a heat treatment of heating the ingot to 300° C. or higher and 1080° C. or lower is performed. In this manner, Mg is uniformly diffused in the ingot or Mg is dissolved in the matrix. In addition, it is preferable that the homogenizing/solutionizing step S02 is performed in a non-oxidizing or reducing atmosphere.

In a case where the heating temperature is lower than 300° C., the solutionization may be incomplete, and a large amount of the intermetallic compound containing Cu and Mg as main components may remain in the matrix. On the contrary, in a case where the heating temperature is higher than 1080° C., a part of the copper material serves a liquid phase, and thus the texture and the surface state may be non-uniform. Therefore, the heating temperature is set to be in a range of 300° C. or higher and 1080° C. or lower. Further, hot working may be performed after the above-described homogenizing/solutionizing step S02 in order to improve the efficiency of rough working and homogenize the texture described below. In this case, the working method is not particularly limited, and for example, rolling, drawing, extruding, groove rolling, forging, and pressing can be employed. Further, it is preferable that the hot working temperature is set to be in a range of 300° C. or higher and 1080° C. or lower.

(Rough Working Step S03)

In order to work into a predetermined shape, rough working is performed. Further, the temperature conditions for this rough working step S03 are not particularly limited, but the working temperature is set to be preferably in a range of −200° C. to 200° C., in which cold working or warm working (for example, rolling) is carried out, and particularly preferably room temperature from the viewpoint of suppressing recrystallization or improving the dimensional accuracy. The working rate is preferably 20% or greater and more preferably 30% or greater. Further, the working method is not particularly limited, and for example, rolling, drawing, extruding, groove rolling, forging, and pressing can be employed.

(Intermediate Heat Treatment Step S04)

After the rough working step S03, a heat treatment is performed for softening to improve the workability or for obtaining a recrystallization structure.

A heat treatment in a continuous annealing furnace for a short period of time is preferable, and localization of Ag segregation to grain boundaries can be prevented in a case where Ag is added. In addition, the intermediate heat treatment step S04 and the finish working step S05 described below may be repeatedly performed.

(Finish Working Step S05)

In order to work the copper material after the intermediate heat treatment step S04 into a predetermined shape, finish working is performed. Further, the temperature conditions in this finish working step S05 are not particularly limited, but the working temperature is set to be preferably in a range of −200° C. to 200° C., in which cold working or warm working is carried out, and particularly preferably room temperature from the viewpoint of suppressing recrystallization during the working or suppressing softening. Further, the working rate is appropriately selected such that the shape of the copper material is close to the final shape, but is preferably 5% or greater in order to improve the strength by work hardening. Further, in a case where rolling is selected, the rolling rate is preferably 90% or less in order to obtain a yield strength of 450 MPa or less so that a winding habit is prevented in a case of being coiled.

Further, the working method is not particularly limited, and for example, rolling, drawing, extruding, groove rolling, forging, and pressing can be employed.

(Mechanical Surface Treatment Step S06)

After the finish working step S05, a mechanical surface treatment is performed. The mechanical surface treatment is a treatment of applying a compressive stress to the vicinity of the surface after a desired shape is obtained, and has an effect of improving stress relaxation resistance.

As the mechanical surface treatment, various methods, which have been typically used, such as a shot peening treatment, a blasting treatment, a lapping treatment, a polishing treatment, buffing, grinder polishing, sandpaper polishing, a tension leveler treatment, and light rolling with a low rolling reduction ratio per pass (light rolling is repeatedly performed three times or more by setting the rolling reduction ratio per pass to 1% to 10%) can be used.

The stress relaxation resistance is greatly improved by applying this mechanical surface treatment to the copper alloy to which Mg has been added.

(Finish Heat Treatment Step S07)

Next, the plastically-worked material obtained by the mechanical surface treatment step S06 may be subjected to a finish heat treatment in order to remove segregation of contained elements to grain boundaries and to remove residual strain.

It is preferable that the heat treatment temperature is set to be in a range of 100° C. or greater and 500° C. or lower. In this finish heat treatment step S07, it is necessary to set heat treatment conditions (the temperature and the time) in order to avoid a large decrease in strength due to recrystallization. For example, it is preferable to hold at 450° C. for approximately 0.1 to 10 seconds and preferable to hold at 250° C. for 1 minute to 100 hours. It is preferable that the heat treatment is performed in a non-oxidizing atmosphere or a reducing atmosphere. A method of performing the heat treatment is not particularly limited, but it is preferable that the heat treatment is performed using a continuous annealing furnace for a short period of time from the viewpoint of the effect of reducing the production cost.

Further, the finish working step S05, the mechanical surface treatment step S06, and the finish heat treatment step S07 may be repeated.

In this manner, the copper alloy (plastically-worked copper alloy material) according to the present embodiment is produced. Further, the plastically-worked copper alloy material produced by rolling is referred to as a rolled copper alloy plate.

In a case where the plate thickness of the plastically-worked copper alloy material (rolled copper alloy plate) is set to 0.1 mm or greater, the plastically-worked copper alloy material is suitable to be used as a conductor for high-current applications. Further, in a case where the plate thickness of the plastically-worked copper alloy material is set to 10.0 mm or less, an increase in the load of a press machine can be suppressed, the productivity per unit time can be ensured, and thus the production cost can be reduced.

Therefore, it is preferable that the plate thickness of the plastically-worked copper alloy material (rolled copper alloy plate) is set to be in a range of 0.1 mm or greater and 10.0 mm or less.

The lower limit of the plate thickness of the plastically-worked copper alloy material (rolled copper alloy plate) is set to preferably 0.5 mm or greater and more preferably 1.0 mm or greater. On the contrary, the upper limit of the plate thickness of the plastically-worked copper alloy material (rolled copper alloy plate) is set to preferably less than 9.0 mm and more preferably less than 8.0 mm.

In the copper alloy according to the present embodiment with the above-described configuration, since the amount of Mg is set to be in a range of greater than 10 mass ppm and less than 100 mass ppm, and the amount of S is set to 10 mass ppm or less, the amount of P is set to 10 mass ppm or less, the amount of Se is set to 5 mass ppm or less, the amount of Te is set to 5 mass ppm or less, the amount of Sb is set to 5 mass ppm or less, the amount of Bi is set to 5 mass ppm or less, the amount of As is set to 5 mass ppm or less, and the total amount of S, P, Se, Te, Sb, Bi, and As, which are the elements generating compounds with Mg, is limited to 30 mass ppm or less, a small amount of added Mg can be dissolved in the Cu matrix, and the stress relaxation resistance can be improved without greatly decreasing the electrical conductivity.

Further, when the amount of Mg is represented as [Mg] and the total amount of S, P, Se, Te, Sb, Bi, and As is represented as [S+P+Se+Te+Sb+Bi+As], since the mass ratio thereof, [Mg]/[S+P+Se+Te+Sb+Bi+As] is set to be in a range of 0.6 or greater and 50 or less, the stress relaxation resistance can be sufficiently improved without decreasing electrical conductivity due to the dissolving of excess amount of Mg.

Therefore, according to the copper alloy of the present embodiment, the electrical conductivity can be set to 97% IACS or greater, the residual stress ratio in a direction parallel to the rolling direction at 150° C. for 1000 hours can be set to 20% or greater, and thus both high electrical conductivity and excellent stress relaxation resistance can be achieved.

Specifically, the electrical conductivity can be set to 97% IACS or greater, and the residual stress ratio in a direction parallel to the rolling direction at 150° C. for 1000 hours can be set to 20% or greater, and thus both high electrical conductivity and excellent stress relaxation resistance can be achieved.

Further, in the copper alloy according to the present embodiment, in a case where the amount of Ag is set to be in a range of 5 mass ppm or greater and 20 mass ppm or less, Ag is segregated in the vicinity of grain boundaries and grain boundary diffusion is suppressed by Ag; and thereby, the stress relaxation resistance can be further improved.

Further, in the copper alloy according to the present embodiment, in a case where the amount of H is set to 10 mass ppm or less, the amount of O is set to 100 mass ppm or less, and the amount of C is set to 10 mass ppm or less, generation of defects such as blowholes, Mg oxides, C inclusions, and carbides can be reduced, and the stress relaxation resistance can be improved without decreasing the workability.

Further, in a case where the half-softening temperature of the copper alloy according to the present embodiment is 200° C. or higher, the copper alloy has sufficiently excellent heat resistance and thus can be used stably even in a high-temperature environment.

Since the plastically-worked copper alloy material according to the present embodiment includes the above-described copper alloy, the plastically-worked copper alloy material has excellent electrical conductivity and excellent stress relaxation resistance, and thus is particularly suitable as a material of a component for electronic/electrical devices, such as a terminal, a bus bar, a lead frame, or a heat dissipation member.

Further, in a case where the plastically-worked copper alloy material according to the present embodiment is a rolled plate having a thickness of 0.1 mm or greater and 10 mm or less, a component for electronic/electrical devices, such as a terminal, a bus bar, a lead frame, or a heat dissipation member, can be relatively easily molded by subjecting the plastically-worked copper alloy material (rolled plate) to punching or bending.

Further, in a case where a Sn plating layer or an Ag plating layer is formed on the surface of the plastically-worked copper alloy material according to the present embodiment, the plastically-worked copper alloy material is particularly suitable as a material of a component for electronic/electrical devices, such as a terminal, a bus bar, or a heat dissipation member.

Further, the component for electronic/electrical devices (such as a terminal, a bus bar, a lead frame, or a heat dissipation member) according to the present embodiment includes the above-described plastically-worked copper alloy material, and thus can exhibit excellent characteristics even in a case of being used for high-current applications in a high-temperature environment.

In addition, the heat dissipation member (heat dissipation substrate) may be prepared by using the above-described copper alloy.

Hereinbefore, the copper alloy, the plastically-worked copper alloy material, and the component for electronic/electrical devices (such as a terminal, a bus bar, or a lead frame) according to the embodiment of the present invention have been described, but the present invention is not limited thereto and can be appropriately changed within a range not departing from the technical features of the invention.

For example, in the above-described embodiment, the example of the method for producing the copper alloy (plastically-worked copper alloy material) has been described, but the method for producing the copper alloy is not limited to the description of the embodiment, and the copper alloy may be produced by appropriately selecting a production method of the related art.

Second Embodiment

Hereinafter, a copper alloy according to an embodiment of the present invention will be described.

The copper alloy according to the present embodiment is a copper alloy which has a composition including Mg in an amount of greater than 10 mass ppm and less than 100 mass ppm, with a balance being Cu and inevitable impurities, in which among the inevitable impurities, the amount of S is 10 mass ppm or less, the amount of P is 10 mass ppm or less, the amount of Se is 5 mass ppm or less, the amount of Te is 5 mass ppm or less, the amount of Sb is 5 mass ppm or less, the amount of Bi is 5 mass ppm or less, and the amount of As is 5 mass ppm or less, and the total amount of S, P, Se, Te, Sb, Bi, and As is 30 mass ppm or less.

Further, when the amount of Mg is represented as [Mg] and the total amount of S, P, Se, Te, Sb, Bi, and As is represented as [S+P+Se+Te+Sb+Bi+As], the mass ratio thereof, [Mg]/[S+P+Se+Te+Sb+Bi+As] is 0.6 or greater and 50 or less.

Further, in the copper alloy according to the present embodiment, the amount of Ag may be 5 mass ppm or greater and 20 mass ppm or less.

Further, the copper alloy according to the present embodiment has an electrical conductivity of 97% IACS or greater.

Further, in the copper alloy of the present embodiment, it is preferable that the residual stress ratio RSG (%) in a direction parallel to the rolling direction after holding at 200° C. for 4 hours is set to 20% or greater.

Further, in the copper alloy according to the present embodiment, the copper alloy is measured by the EBSD method in a measurement area of 10000 $\mu m^2$ or greater at every measurement interval of 0.25 μm. The measured results are analyzed by data analysis software OIM to obtain a CI value at each measurement point. The measurement point at which a CI value is 0.1 or less is removed. The orientation difference between crystal grains is analyzed by the data analysis software OIM, and a boundary having 15° or greater of an orientation difference between neighboring measurement points is assigned as a crystal grain boundary. The average grain size A is acquired according to Area Fraction using the data analysis software OIM. The copper alloy is measured at every measurement interval which is 1/10 or less of the average grain size A by the EBSD method. The measured results are analyzed by the data analysis software OIM with a total area of 10000 $\mu m^2$ or greater in a plurality of visual fields such that a total of 1000 or more crystal grains are included to obtain a CI value at each measurement point. The measurement point at which a CI value is 0.1 or less is removed. The orientation difference between crystal grains is analyzed by the data analysis software OIM, and a boundary having 5° or greater of an orientation difference between neighboring pixels (measurement points) is assigned as a crystal grain boundary. The average value of the Kernel Average Misorientation (KAM) values in this case is set to 2.4 or less.

In the copper alloy according to the present embodiment, the reasons for specifying the component composition, the texture, and various characteristics as described above will be described.

(Mg)

Mg is an element having an effect of improving the strength and the stress relaxation resistance without greatly decreasing the electrical conductivity by being dissolved in the Cu matrix. Further, the heat resistance is also improved by dissolving Mg in the matrix.

In a case where the amount of Mg is 10 mass ppm or less, there is a concern that the effect may not be sufficiently exhibited. On the contrary, in a case where the amount of Mg is 100 mass ppm or greater, the electrical conductivity may be decreased.

As described above, in the present embodiment, the amount of Mg is set to be in a range of greater than 10 mass ppm and less than 100 mass ppm.

Further, in order to further improve the stress relaxation resistance, the lower limit of the amount of Mg is preferably 20 mass ppm or greater, more preferably 30 mass ppm or greater, and still more preferably 40 mass ppm or greater.

Further, in order to further increase the electrical conductivity, the upper limit of the amount of Mg is preferably less than 90 mass ppm. In a case where the electrical conductivity is increased, the upper limit of the amount of Mg is more preferably less than 80 mass ppm and more preferably less than 70 mass ppm in order to achieve the balance between the electrical conductivity, the heat resistance, and the stress relaxation characteristic.

(S, P, Se, Te, Sb, Bi, and As)

The elements such as S, P, Se, Te, Sb, Bi, and As described above are elements that are typically easily mixed into a copper alloy. These elements are likely to react with Mg to form a compound, and thus may reduce the solid-solution effect of a small amount of added Mg. Therefore, the amounts of these elements are required to be strictly controlled.

Therefore, in the present embodiment, the amount of S is limited to 10 mass ppm or less, the amount of P is limited to 10 mass ppm or less, the amount of Se is limited to 5 mass ppm or less, the amount of Te is limited to 5 mass ppm or less, the amount of Sb is limited to 5 mass ppm or less, the amount of Bi is limited to 5 mass ppm or less, and the amount of As is limited to 5 mass ppm or less.

Further, the total amount of S, P, Se, Te, Sb, Bi, and As is limited to 30 mass ppm or less.

The lower limits of the amounts of the above-described elements are not particularly limited, but the amount of each of S, P, Sb, Bi, and As is preferably 0.1 mass ppm or greater, the amount of Se is preferably 0.05 mass ppm or greater, and the amount of Te is preferably 0.01 mass ppm or greater from the viewpoint that the production cost is increased in order to greatly reduce the amounts of the above-described elements.

The lower limit of the total amount of S, P, Se, Te, Sb, Bi, and As is not particularly limited, but the total amount of S, P, Se, Te, Sb, Bi, and As is preferably 0.6 mass ppm or greater from the viewpoint that the production cost is increased in order to greatly reduce the total amount thereof.

Further, the amount of S is preferably 9 mass ppm or less and more preferably 8 mass ppm or less.

The amount of P is preferably 6 mass ppm or less and more preferably 3 mass ppm or less.

The amount of Se is preferably 4 mass ppm or less and more preferably 2 mass ppm or less.

The amount of Te is preferably 4 mass ppm or less and more preferably 2 mass ppm or less.

The amount of Sb is preferably 4 mass ppm or less and more preferably 2 mass ppm or less.

The amount of Bi is preferably 4 mass ppm or less and more preferably 2 mass ppm or less.

The amount of As is preferably 4 mass ppm or less and more preferably 2 mass ppm or less.

Further, the total amount of S, P, Se, Te, Sb, Bi, and As is preferably 24 mass ppm or less and more preferably 18 mass ppm or less.

([Mg]/[S+P+Se+Te+Sb+Bi+As])

As described above, since elements such as S, P, Se, Te, Sb, Bi, and As easily react with Mg to form compounds, the existence form of Mg is controlled by defining the ratio between the amount of Mg and the total amount of S, P, Se, Te, Sb, Bi, and As in the present embodiment.

When the amount of Mg is represented as [Mg] and the total amount of S, P, Se, Te, Sb, Bi, and As is represented as [S+P+Se+Te+Sb+Bi+As], in a case where the mass ratio thereof, [Mg]/[S+P+Se+Te+Sb+Bi+As] is greater than 50, Mg is excessively present in copper in a solid solution state, and thus the electrical conductivity may be decreased. On the contrary, in a case where the mass ratio thereof, [Mg]/[S+P+Se+Te+Sb+Bi+As] is less than 0.6, Mg is not sufficiently dissolved in copper, and thus the stress relaxation resistance may not be sufficiently improved.

Therefore, in the present embodiment, the mass ratio [Mg]/[S+P+Se+Te+Sb +Bi+As] is set to be in a range of 0.6 or greater and 50 or less.

In addition, the amount of each element in the above-described mass ratio is in units of mass ppm.

In order to further suppress a decrease in electrical conductivity, the upper limit of the mass ratio [Mg]/[S+P+Se+Te+Sb+Bi+As] is preferably 35 or less and more preferably 25 or less.

Further, in order to further improve the stress relaxation resistance, the lower limit of the mass ratio [Mg]/[S+P+Se+Te+Sb+Bi+As] is set to preferably 0.8 or greater and more preferably 1.0 or greater.

(Ag: 5 Mass Ppm or Greater and 20 Mass Ppm or Less)

Ag is unlikely to be dissolved in the Cu matrix in a temperature range of 250° C. or lower, in which typical electronic/electrical devices are used. Therefore, a small amount of Ag added to copper segregates in the vicinity of grain boundaries. In this manner, since movement of atoms at grain boundaries is hindered and grain boundary diffusion is suppressed, the stress relaxation resistance is improved.

In a case where the amount of Ag is 5 mass ppm or greater, the effects can be sufficiently exhibited. On the contrary, in a case where the amount of Ag is 20 mass ppm or less, the electrical conductivity can be ensured and an increase in production cost can be suppressed.

As described above, in the present embodiment, the amount of Ag is set to be in a range of 5 mass ppm or greater and 20 mass ppm or less.

In order to further improve the stress relaxation resistance, the lower limit of the amount of Ag is set to preferably 6 mass ppm or greater, more preferably 7 mass ppm or greater, and still more preferably 8 mass ppm or greater. Further, in order to reliably suppress a decrease in the electrical conductivity and an increase in cost, the upper limit of the amount of Ag is set to preferably 18 mass ppm or less, more preferably 16 mass ppm or less, and still more preferably 14 mass ppm or less.

Further, in a case where Ag is not intentionally included and the inevitable impurities include Ag, the amount of Ag may be less than 5 mass ppm.

(Other Inevitable Impurities)

Examples of other inevitable impurities other than the above-described elements include Al, B, Ba, Be, Ca, Cd, Cr, Sc, rare earth elements, V, Nb, Ta, Mo, Ni, W, Mn, Re, Ru, Sr, Ti, Os, Co, Rh, Ir, Pb, Pd, Pt, Au, Zn, Zr, Hf, Hg, Ga, In, Ge, Y, TI, N, Si, Sn, and Li. The copper alloy may contain inevitable impurities within a range not affecting the characteristics.

Since there is a concern that the electrical conductivity is decreased, it is preferable that the amount of the inevitable impurities is reduced.

(Electrical Conductivity: 97% IACS or Greater)

In the copper alloy according to the present embodiment, the electrical conductivity is 97% IACS or greater. The heat generation in a case of electrical conduction is suppressed by setting the electrical conductivity to 97% IACS or greater so that the copper alloy can be satisfactorily used as a component for electronic/electrical devices such as a terminal, a bus bar, a lead frame, or a heat dissipation substrate as a substitute to a pure copper material.

The electrical conductivity is preferably 97.5% IACS or greater, more preferably 98.0% IACS or greater, still more preferably 98.5% IACS or greater, and even still more preferably 99.0% IACS or greater.

The upper limit of the electrical conductivity is not particularly limited, but is preferably 103.0% IACS or less.

(Residual Stress Ratio RSG (%) in Direction Parallel to Rolling Direction after Holding at 200° C. For 4 Hours: 20% or Greater)

In the copper alloy according to the present embodiment, it is preferable that the residual stress ratio RSG (%) in a direction parallel to the rolling direction after holding at 200° C. for 4 hours is set to 20% or greater.

In a case where the residual stress ratio under the above-described conditions is high, permanent deformation can be suppressed to be small in a case of being used in a high-temperature environment, and a decrease in contact pressure can be suppressed. Therefore, the copper alloy according to the present embodiment is particularly suitable as a terminal to be used in a high-temperature environment such as the periphery of an engine room of an automobile.

Further, the residual stress ratio RSG (%) in a direction parallel to the rolling direction after holding at 200° C. for 4 hours is set to more preferably 30% or greater, more preferably 40% or greater, and still more preferably 50% or greater.

(Average Value of KAM Values: 2.4 or Less)

The Kernel Average Misorientation (KAM) value measured by EBSD is a value calculated by averaging the orientation difference between one pixel and pixels surrounding the pixel. Since the shape of the pixel is a regular hexagon, in a case where the degree of proximity is set to 1 (1st), the average value of the orientation differences between one pixel and six adjacent pixels is calculated as the KAM value. By using this KAM value, the distribution of the local orientation difference, that is, the strain can be visualized.

Since the region with a high KAM value is a region with a high density of dislocations (GN dislocations) introduced during working, high-speed diffusion of atoms via the dislocations is likely to occur, and stress relaxation is likely to occur.

Therefore, the stress relaxation resistance can be improved while the strength is maintained by controlling the average value of the KAM values to 2.4 or less.

Further, the average value of the KAM values is preferably 2.2 or less, more preferably 2.0 or less, still more preferably 1.8 or less, and even still more preferably 1.6 or less, even within the above-described range. Meanwhile, the lower limit of the average value of the KAM values is not particularly limited, but the average value of the KAM values is more preferably 0.2 or greater, still more preferably 0.4 or greater, even still more preferably 0.6 or greater, and most preferably 0.8 or greater from the viewpoint of ensuring the amount of work hardening to obtain sufficient strength.

In addition, in the present embodiment, the KAM value is calculated after the measurement points where the confidence index (CI) value, which is the value measured by the analysis software OIM Analysis (Ver.7.3.1) of an EBSD device, is 0.1 or less are removed. The CI value is calculated by using a Voting method in a case of indexing the EBSD pattern obtained from a certain analysis point, and a value from 0 to 1 is employed as the CI value. Since the CI value is a value for evaluating the reliability of the indexing and the orientation calculation, in a case where the CI value is small, that is, in a case where a clear crystal pattern of an analysis point cannot be obtained, it can be said that strain (worked texture) is present in the texture. Particularly in a case where the strain is large, a value of 0.1 or less is employed as the CI value.

Next, a method for producing the copper alloy according to the present embodiment with such a configuration will be described with reference to the flow chart shown in the drawing.

(Melting and Casting Step S01)

First, the above-described elements are added to molten copper obtained by melting the copper raw material to adjust components; and thereby, a molten copper alloy is produced. Further, a single element, a base alloy, or the like can be used for addition of various elements. In addition, raw materials containing the above-described elements may be melted together with the copper raw material. Further, a recycled material or a scrap material of the copper alloy of the present embodiment may be used.

As the copper raw material, so-called 4N Cu having a purity of 99.99% by mass or greater or so-called 5N Cu having a purity of 99.999% by mass or greater is preferably used.

During melting, in order to suppress oxidation of Mg and to reduce the hydrogen concentration, it is preferable that the melting is carried out in an atmosphere using an inert gas atmosphere (for example, Ar gas) in which the vapor pressure of $H_2O$ is low and the holding time for the melting is set to the minimum.

Then, the molten copper alloy in which the components have been adjusted is poured into a mold to produce an ingot. In consideration of mass production, it is preferable to use a continuous casting method or a semi-continuous casting method.

(Homogenizing/Solutionizing Step S02)

Next, a heat treatment is performed for homogenization and solutionization of the obtained ingot. An intermetallic compound or the like containing Cu and Mg as main components may be present inside the ingot, and the intermetallic compound is generated by segregation and concentration of Mg in the solidification process. Therefore, in order to eliminate or reduce the segregated elements and the intermetallic compound, a heat treatment of heating the ingot to 300° C. or higher and 1080° C. or lower is performed. In this manner, Mg is uniformly diffused in the ingot or Mg is dissolved in the matrix. In addition, it is preferable that the homogenizing/solutionizing step S02 is performed in a non-oxidizing or reducing atmosphere.

In a case where the heating temperature is lower than 300° C., the solutionization may be incomplete, and a large amount of the intermetallic compound containing Cu and Mg as main components may remain in the matrix. On the contrary, in a case where the heating temperature is higher than 1080° C., a part of the copper material serves a liquid phase, and thus the texture and the surface state may be non-uniform. Therefore, the heating temperature is set to be in a range of 300° C. or higher and 1080° C. or lower.

Further, hot working may be performed after the above-described homogenizing/solutionizing step S02 in order to improve the efficiency of rough working and homogenize the texture described below. In this case, the working method is not particularly limited, and for example, rolling, drawing, extruding, groove rolling, forging, and pressing can be employed. Further, it is preferable that the hot working temperature is set to be in a range of 300° C. or higher and 1080° C. or lower.

(Rough Working Step S03)

In order to work into a predetermined shape, rough working is performed. Further, the temperature conditions for this rough working step S03 are not particularly limited, but the working temperature is set to be preferably in a range of −200° C. to 200° C., in which cold working or warm working (for example, rolling) is carried out, and particularly preferably room temperature from the viewpoint of suppressing recrystallization or improving the dimensional accuracy. The working rate is preferably 20% or greater and more preferably 30% or greater. Further, the working method is not particularly limited, and for example, rolling, drawing, extruding, groove rolling, forging, and pressing can be employed.

(Intermediate Heat Treatment Step S04)

After the rough working step S03, a heat treatment is performed to obtain a recrystallization structure. Further, the intermediate heat treatment step S04 and the finish working step S05 described below may be repeated.

Since this intermediate heat treatment step S04 is substantially the final recrystallization heat treatment, the crystal grain size of the recrystallization structure obtained in this step is approximately the same as the final crystal grain size. Therefore, in the intermediate heat treatment step S04, it is preferable that the heat treatment conditions are appropriately selected such that the average crystal grain size is set to 5 μm or greater. For example, it is preferable to hold for approximately 1 second to 120 seconds in a case of a temperature of 700° C.

(Finish Working Step S05)

In order to work the copper material after the intermediate heat treatment step S04 into a predetermined shape, finish working is performed. Further, the temperature conditions in this finish working step S05 are not particularly limited, but the working temperature is set to be preferably in a range of −200° C. to 200° C., in which cold working or warm working is carried out, and particularly preferably room temperature from the viewpoint of suppressing recrystallization during the working or suppressing softening. Further, the working rate is appropriately selected such that the shape of the copper material is close to the final shape, but is preferably 5% or greater in order to improve the strength by work hardening. Meanwhile, in order to suppress an excessive increase in the KAM value, the working rate is set to preferably 85% or less and more preferably 80% or less.

Further, the working method is not particularly limited, and for example, rolling, drawing, extruding, groove rolling, forging, and pressing can be employed.

(Mechanical Surface Treatment Step S06)

After the finish working step S05, a mechanical surface treatment is performed. The mechanical surface treatment is a treatment of applying a compressive stress to the vicinity of the surface after a desired shape is obtained, and has an effect of improving stress relaxation resistance.

As the mechanical surface treatment, various methods, which have been typically used, such as a shot peening treatment, a blasting treatment, a lapping treatment, a polishing treatment, buffing, grinder polishing, sandpaper polishing, a tension leveler treatment, and light rolling with a low rolling reduction ratio per pass (light rolling is repeatedly performed three times or more by setting the rolling reduction ratio per pass to 1% to 10%) can be used.

The stress relaxation resistance is greatly improved by applying this mechanical surface treatment to the copper alloy to which Mg has been added.

(Finish Heat Treatment Step S07)

Next, the plastically-worked material obtained by the mechanical surface treatment step S06 is subjected to the finish heat treatment in order to remove segregation of contained elements to grain boundaries and to remove residual strain.

It is preferable that the heat treatment temperature is set to be in a range of 100° C. or greater and 500° C. or lower.

Further, in this finish heat treatment step S07, the heat treatment conditions are required to be set such that a significant decrease in strength due to recrystallization is avoided and the dislocation arrangement is optimized by removing residual strain to reduce the KAM value which has been excessively increased. For example, it is preferable to hold at 450° C. for approximately 0.1 to 10 seconds and preferable to hold at 250° C. for 1 minute to 100 hours. It is preferable that the heat treatment is performed in a non-oxidizing atmosphere or a reducing atmosphere. A method of performing the heat treatment is not particularly limited, but it is preferable that the heat treatment is performed using a continuous annealing furnace for a short period of time from the viewpoint of the effect of reducing the production cost.

Further, the finish working step S05, the mechanical surface treatment step S06, and the finish heat treatment step S07 may be repeated.

In this manner, the copper alloy (plastically-worked copper alloy material) according to the present embodiment is produced. Further, the plastically-worked copper alloy material produced by rolling is referred to as a rolled copper alloy plate.

In a case where the plate thickness of the plastically-worked copper alloy material (rolled copper alloy plate) is set to 0.1 mm or greater, the plastically-worked copper alloy material is suitable for use as a conductor for high-current applications. Further, in a case where the plate thickness of the plastically-worked copper alloy material is set to 10.0 mm or less, an increase in the load of a press machine can be suppressed, the productivity per unit time can be ensured, and thus the production cost can be reduced.

Therefore, it is preferable that the plate thickness of the plastically-worked copper alloy material (rolled copper alloy plate) is set to be in a range of 0.1 mm or greater and 10.0 mm or less.

The lower limit of the plate thickness of the plastically-worked copper alloy material (rolled copper alloy plate) is set to preferably 0.5 mm or greater and more preferably 1.0 mm or greater. On the contrary, the upper limit of the plate thickness of the plastically-worked copper alloy material (rolled copper alloy plate) is set to preferably less than 9.0 mm and more preferably less than 8.0 mm.

In the copper alloy according to the present embodiment with the above-described configuration, since the amount of Mg is set to be in a range of greater than 10 mass ppm and less than 100 mass ppm, and the amount of S is set to 10 mass ppm or less, the amount of P is set to 10 mass ppm or less, the amount of Se is set to 5 mass ppm or less, the amount of Te is set to 5 mass ppm or less, the amount of Sb is set to 5 mass ppm or less, the amount of Bi is set to 5 mass ppm or less, the amount of As is set to 5 mass ppm or less, and the total amount of S, P, Se, Te, Sb, Bi, and As, which are the elements generating compounds with Mg, is limited to 30 mass ppm or less, a small amount of added Mg can be dissolved in the Cu matrix, and the stress relaxation resistance can be improved without greatly decreasing the electrical conductivity.

Further, when the amount of Mg is represented as [Mg] and the total amount of S, P, Se, Te, Sb, Bi, and As is represented as [S+P+Se+Te+Sb+Bi+As], since the mass ratio thereof, [Mg]/[S+P+Se+Te+Sb+Bi+As] is set to be in a range of 0.6 or greater and 50 or less, the stress relaxation resistance can be sufficiently improved without decreasing electrical conductivity due to the dissolving of excess amount of Mg. Therefore, according to the copper alloy of the present embodiment, the electrical conductivity can be set to 97% IACS or greater, the residual stress ratio RSG (%) in a direction parallel to the rolling direction after holding at 200° C. for 4 hours can be set to 20% or greater, and thus both high electrical conductivity and excellent stress relaxation resistance can be achieved.

Further, in the present embodiment, since the average value of the KAM values is set to 2.4 or less, the stress relaxation resistance can be improved while the strength is maintained.

In the present embodiment, in a case where the amount of Ag is set to be in a range of 5 mass ppm or greater and 20 mass ppm or less, Ag is segregated in the vicinity of grain boundaries and grain boundary diffusion is suppressed by Ag; and thereby, the stress relaxation resistance can be further improved.

Since the plastically-worked copper alloy material according to the present embodiment includes the above-described copper alloy, the plastically-worked copper alloy material has excellent electrical conductivity and excellent stress relaxation resistance, and thus is particularly suitable as a material of a component for electronic/electrical devices, such as a terminal, a bus bar, a lead frame, or a heat dissipation substrate.

Further, in a case where the plastically-worked copper alloy material according to the present embodiment is a rolled plate having a thickness of 0.1 mm or greater and 10 mm or less, a component for electronic/electrical devices, such as a terminal, a bus bar, a lead frame, or a heat dissipation substrate, can be relatively easily molded by subjecting the plastically-worked copper alloy material (rolled plate) to punching or bending.

Further, in a case where a Sn plating layer or an Ag plating layer is formed on the surface of the plastically-worked copper alloy material according to the present embodiment, the plastically-worked copper alloy material is particularly suitable as a material of a component for electronic/electrical devices, such as a terminal, a lead frame, a bus bar, or a heat dissipation substrate.

Further, the component for electronic/electrical devices (such as a terminal, a bus bar, a lead frame, or a heat dissipation substrate) according to the present embodiment includes the above-described plastically-worked copper alloy material, and thus can exhibit excellent characteristics even in a case of being used for high-current applications in a high-temperature environment.

In addition, the heat dissipation member (heat dissipation substrate) may be prepared by using the above-described copper alloy.

Hereinbefore, the copper alloy, the plastically-worked copper alloy material, and the component for electronic/electrical devices (such as a terminal, a bus bar, a lead frame, or a heat dissipation substrate) according to the embodiment of the present invention have been described, but the present invention is not limited thereto and can be appropriately changed within a range not departing from the technical features of the invention.

For example, in the above-described embodiment, the example of the method for producing the copper alloy (plastically-worked copper alloy material) has been described, but the method for producing the copper alloy is not limited to the description of the embodiment, and the copper alloy may be produced by appropriately selecting a production method of the related art.

EXAMPLES

Example 1

Hereinafter, results of a verification test conducted to verify the effects of the first embodiment will be described.

A copper raw material in which the amount of H was 0.1 mass ppm or less, the amount of O was 1.0 mass ppm or less, the amount of S was 1.0 mass ppm or less, the amount of C was 0.3 mass ppm or less, and the purity of Cu was 99.99% by mass or greater was prepared. In addition, a base alloy containing 1% by mass of various additive elements was prepared by using a high-purity copper with 6N (purity of 99.9999% by mass) or greater and a pure metal with 2N (purity of 99% by mass) or greater.

The above-described copper raw material was charged into a high-purity alumina crucible and melted using a high frequency induction melting furnace in a high-purity Ar gas (dew point of −80° C. or lower) atmosphere.

Each component composition listed in Tables 1 and 2 was prepared using the above-described base alloy in the obtained molten copper, and in a case where H and O were introduced, the atmosphere during melting was prepared as an Ar—$N_2$—$H_2$ and Ar—$O_2$-mixed gas atmosphere using high-purity Ar gas (dew point of −80° C. or lower), high-purity $N_2$ gas (dew point of −80° C. or lower), high-purity $O_2$ gas (dew point of −80° C. or lower), and high-purity $H_2$ gas (dew point of −80° C. or lower). In a case where C was introduced, the surface of the molten metal was coated with C particles during melting and brought into contact with the molten metal.

In this manner, alloy molten metals having the component composition listed in Tables 1 and 2 were melted and poured into a heat insulating material (refractory material) mold to produce an ingot. Further, the thickness of the ingot was approximately 30 mm.

The obtained ingot was heated at 900° C. for 1 hour in an Ar gas atmosphere in order to solutionize Mg, and the surface was ground to remove the oxide film, and the ingot was cut into a predetermined size.

Thereafter, the thickness of the ingot was appropriately adjusted to obtain the final thickness, and the ingot was cut. Each of the cut specimens were subjected to rough rolling under the conditions listed in Tables 3 and 4. Next, an intermediate heat treatment was performed under the condition that the crystal grain size was set to approximately 30 μm by recrystallization.

Next, finish rolling (finish working step) was performed under the conditions listed in Tables 3 and 4.

Next, these specimens were subjected to a mechanical surface treatment step by the method listed in Tables 3 and 4.

Further, the buffing was performed using #800 abrasive paper.

Tension leveler was performed by using a tension leveler equipped with a plurality of φ10 mm rolls under a condition where the line tension was set to 100 N/$mm^2$.

Light rolling (rolling with a low rolling reduction ratio per pass) was performed with a rolling reduction ratio of 5% per pass for the final 5 passes.

Thereafter, a finish heat treatment was performed under the conditions listed in Tables 3 and 4 to produce a strip material having a thickness listed in Tables 3 and 4 and a width of approximately 60 mm.

The obtained strip materials were evaluated for the following items.

(Composition Analysis)

A measurement specimen was collected from the obtained ingot, the amount of Mg was measured by inductively coupled plasma atomic emission spectrophotometry, and the amounts of other elements were measured using a glow discharge mass spectrometer (GD-MS). Further, quantitative analysis of H was performed by a thermal conductivity method, and quantitative analysis of O, S, and C was performed by an infrared absorption method.

Further, the measurement was performed at two sites, the center portion of the specimen and the end portion of the specimen in the width direction, and the larger amount was defined as the amount of the sample. As a result, it was confirmed that the component compositions were as listed in Tables 1 and 2.

(Electrical Conductivity)

Test pieces having a width of 10 mm and a length of 60 mm were collected from each strip material for characteristic evaluation and the electric resistance was acquired according to a 4 terminal method. Further, the dimension of each test piece was measured using a micrometer and the volume of the test piece was calculated. Then, the electrical conductivity was calculated from the measured electric resistance value and volume. Further, the test pieces were collected such that the longitudinal directions thereof were parallel to the rolling direction of each strip material for characteristic evaluation. The evaluation results are listed in Tables 3 and 4.

(Stress Relaxation Resistance)

A stress relaxation resistance test was carried out by loading a stress according to a method in conformity with a cantilever screw type in JCBA-T309:2004 of Japan Copper and Brass Association and the residual stress ratio after holding at a temperature of 150° C. for 1000 hours was measured. The evaluation results are listed in Tables 3 and 4.

According to the test method, test pieces (width of 10 mm) were collected in a direction parallel to the rolling direction from each strip material for characteristic evaluation, the initial deflection displacement was set to 2 mm such that the maximum surface stress of each test piece was 80% of the yield strength, and the span length was adjusted. The maximum surface stress was determined according to the following equation.

Maximum surface stress (MPa)$=1.5Et\delta_0/L_s^2$

Each symbol represents the following value.

E: Young's modulus (MPa)

t: thickness (mm) of specimen $\delta_0$: initial deflection displacement (mm)

$L_s$: span length (mm)

The residual stress ratio was measured in a direction parallel to the rolling direction based on the bending habit after holding at a temperature of 150° C. for 1000 hours and the stress relaxation resistance was evaluated. Further, the residual stress ratio was calculated using the following equation.

Residual stress ratio (%)$=(1-\delta_t/\delta_0)\times 100$

Each symbol represents the following value.

$\delta_t$: (permanent deflection displacement (mm) after holding at 150° C. for 1000 hours)−(permanent deflection displacement (mm) after holding at room temperature for 24 hours) § o: initial deflection displacement (mm)

(Half-Softening Temperature)

The half-softening temperature (heat treatment temperature at which the intermediate hardness value between the initial hardness value and the hardness value after a full heat treatment) was evaluated by obtaining an isochrone softening curve using the Vickers hardness after one hour of the heat treatment with reference to JCBA T325:2013 of Japan Copper and Brass Association. Further, the rolled surface was used as the measurement surface for the Vickers hardness. The evaluation results are listed in Tables 3 and 4.

(Mechanical Characteristics)

#13B test pieces specified in JIS Z 2241 were collected from each strip material for characteristic evaluation and the 0.2% yield strength was measured according to the offset method in JIS Z 2241. Further, the test pieces were collected in a direction parallel to the rolling direction. The evaluation results are listed in Tables 3 and 4.

(Number of Times of Breaking in Tensile Test)

A tensile test was performed 10 times using the #13B test pieces described above, and the number of times the tensile test piece broke in an elastic region before a 0.2% yield strength reached was defined as the number of times of breaking in the tensile test and measured. The evaluation results are listed in Tables 3 and 4.

Further, the elastic region denotes a region that satisfies a linear relationship in the stress-strain curve. The workability decreases due to the inclusions as the number of times of breaking increases.

TABLE 1

| | | Component composition (mass ratio) | | | | | | | | | | | | | [S + P + Se + Te + Sb + Bi + As] ppm | [Mg]/[S + P + Se + Te + Sb + Bi + As] |
|---|---|---|---|---|---|---|---|---|---|---|---|---|---|---|---|---|
| | | | | Impurities | | | | | | | | | | | | |
| | | Mg ppm | Ag ppm | S ppm | P ppm | Se ppm | Te ppm | Sb ppm | Bi ppm | As ppm | H ppm | O ppm | C ppm | Cu | | |
| Invention Examples | 1-1 | 11 | 4.0 | 2.2 | 2.2 | 0.3 | 0.2 | 0.4 | 0.2 | 0.4 | 0.5 | 2.0 | 1.0 | Balance | 5.9 | 1.9 |
| | 1-2 | 22 | 12.0 | 3.1 | 2.8 | 2.1 | 2.0 | 0.7 | 0.8 | 0.2 | 1.4 | 1.7 | 2.3 | Balance | 11.7 | 1.9 |
| | 1-3 | 34 | 19.0 | 5.1 | 2.3 | 2.1 | 0.2 | 0.1 | 2.1 | 0.6 | 4.4 | 21.3 | 8.4 | Balance | 12.5 | 2.7 |
| | 1-4 | 48 | 8.0 | 2.1 | 1.9 | 1.0 | 0.8 | 1.2 | 0.2 | 1.1 | 2.1 | 2.0 | 1.2 | Balance | 8.3 | 5.8 |
| | 1-5 | 61 | 3.0 | 3.2 | 1.3 | 3.0 | 1.2 | 0.1 | 0.2 | 0.2 | 0.8 | 0.2 | 6.5 | Balance | 9.2 | 6.6 |
| | 1-6 | 79 | 13.0 | 1.2 | 0.8 | 1.2 | 0.2 | 0.8 | 0.2 | 0.8 | 0.2 | 1.0 | 1.0 | Balance | 5.2 | 15.2 |
| | 1-7 | 85 | 14.0 | 5.8 | 5.5 | 3.4 | 3.1 | 3.3 | 3.0 | 3.1 | 1.5 | 1.5 | 6.5 | Balance | 27.2 | 3.1 |
| | 1-8 | 11 | 5.0 | 5.5 | 5.5 | 3.2 | 0.8 | 0.7 | 0.2 | 0.3 | 0.1 | 0.2 | 0.5 | Balance | 16.2 | 0.7 |
| | 1-9 | 23 | 12.0 | 3.5 | 2.7 | 2.4 | 0.3 | 0.2 | 2.1 | 0.1 | 1.1 | 1.1 | 0.8 | Balance | 11.3 | 2.0 |
| | 1-10 | 34 | 19.0 | 2.4 | 0.9 | 1.8 | 0.8 | 0.2 | 1.2 | 0.1 | 4.2 | 6.5 | 0.5 | Balance | 7.4 | 4.6 |
| | 1-11 | 44 | 9.0 | 7.8 | 5.5 | 1.4 | 0.2 | 0.8 | 0.3 | 0.8 | 0.8 | 1.9 | 1.0 | Balance | 16.8 | 2.6 |
| | 1-12 | 63 | 9.0 | 2.6 | 0.8 | 2.3 | 1.2 | 0.1 | 1.6 | 0.2 | 53.0 | 20.1 | 7.2 | Balance | 8.8 | 7.2 |
| | 1-13 | 78 | 15.0 | 5.5 | 1.6 | 1.6 | 0.1 | 1.3 | 0.2 | 0.3 | 3.3 | 1.8 | 1.1 | Balance | 10.6 | 7.4 |
| | 1-14 | 85 | 12.0 | 3.0 | 1.3 | 0.1 | 0.3 | 1.0 | 0.2 | 0.3 | 0.2 | 1.6 | 0.7 | Balance | 6.2 | 13.7 |
| | 1-15 | 99 | 18.0 | 7.7 | 5.1 | 2.3 | 2.4 | 3.1 | 2.1 | 2.1 | 6.0 | 21.0 | 2.1 | Balance | 24.8 | 4.0 |

TABLE 2

| | | Component composition (mass ratio) | | | | | | | | | | | | | [S + P + Se + Te + Sb + Bi + As] ppm | [Mg]/[S + P + Se + Te + Sb + Bi + As] |
|---|---|---|---|---|---|---|---|---|---|---|---|---|---|---|---|---|
| | | | | Impurities | | | | | | | | | | | | |
| | | Mg ppm | Ag ppm | S ppm | P ppm | Se ppm | Te ppm | Sb ppm | Bi ppm | As ppm | H ppm | O ppm | C ppm | Cu | | |
| Invention Examples | 1-16 | 12 | 8.0 | 2.1 | 1.4 | 0.8 | 0.1 | 0.2 | 0.2 | 0.2 | 2.1 | 1.2 | 0.8 | Balance | 5.0 | 2.4 |
| | 1-17 | 22 | 19.0 | 3.5 | 2.1 | 0.8 | 0.1 | 0.9 | 0.3 | 0.4 | 1.0 | 1.2 | 0.8 | Balance | 8.1 | 2.7 |
| | 1-18 | 34 | 18.0 | 3.5 | 3.1 | 1.2 | 1.1 | 0.1 | 0.8 | 0.4 | 8.1 | 360.0 | 9.0 | Balance | 10.2 | 3.3 |
| | 1-19 | 47 | 12.0 | 2.1 | 1.1 | 1.1 | 0.8 | 0.8 | 0.2 | 0.1 | 0.2 | 1.8 | 0.7 | Balance | 6.2 | 7.6 |
| | 1-20 | 59 | 25.0 | 4.6 | 4.5 | 0.5 | 2.1 | 1.3 | 0.3 | 4.9 | 4.4 | 42.0 | 2.4 | Balance | 18.2 | 3.2 |
| | 1-21 | 79 | 7.0 | 5.3 | 5.5 | 1.1 | 1.4 | 0.9 | 0.1 | 0.0 | 5.6 | 89.1 | 25.0 | Balance | 14.3 | 5.5 |
| | 1-22 | 88 | 18.0 | 1.2 | 1.2 | 0.1 | 0.1 | 0.1 | 0.1 | 0.1 | 0.8 | 1.8 | 0.8 | Balance | 2.9 | 30.3 |
| | 1-23 | 98 | 13.0 | 0.7 | 0.8 | 0.1 | 0.1 | 0.1 | 0.1 | 0.1 | 0.2 | 0.2 | 0.7 | Balance | 2.0 | 49.0 |
| Comparative Example | 1-1 | 8 | 15.0 | 3.2 | 0.2 | 0.5 | 0.3 | 0.4 | 0.3 | 0.2 | 0.5 | 2.2 | 1.1 | Balance | 5.1 | 1.6 |
| | 1-2 | 2340 | 12.0 | 3.2 | 2.2 | 1.1 | 1.2 | 1.1 | 0.8 | 0.8 | 0.5 | 0.2 | 1.0 | Balance | 10.4 | 225.0 |
| | 1-3 | 45 | 8.0 | 7.2 | 7.3 | 4.3 | 3.8 | 3.7 | 3.2 | 3.2 | 1.2 | 1.3 | 0.9 | Balance | 32.7 | 1.4 |
| | 1-4 | 11 | 19.0 | 4.8 | 4.5 | 2.1 | 3.4 | 2.1 | 3.3 | 3.1 | 4.3 | 1.8 | 2.2 | Balance | 23.3 | 0.5 |

TABLE 3

| | | Producing step | | | | | | Evaluation | | | | |
|---|---|---|---|---|---|---|---|---|---|---|---|---|
| | | Rough working Rolling rate % | Finish working Rolling rate % | Mechanical surface treatment | Finish heat treatment | | | | | | | |
| | | | | | Temperature ° C. | Time sec. | Thickness mm | Electrical conductivity % IACS | Residual stress ratio % | Half-softening temperature ° C. | 0.2% yield strength MPa | Number of times of breaking times/10 |
| Invention Examples | 1-1 | 70 | 20 | Buffing treatment | 350 | 60 | 5.0 | 99.9 | 25 | 205 | 267 | 0 |
| | 1-2 | 60 | 15 | Buffing treatment | 350 | 60 | 10.0 | 99.7 | 32 | 231 | 237 | 0 |
| | 1-3 | 90 | 60 | Buffing treatment | 250 | 180000 | 0.5 | 99.0 | 63 | 263 | 349 | 0 |

TABLE 3-continued

| | Producing step | | | | | | Evaluation | | | | | |
|---|---|---|---|---|---|---|---|---|---|---|---|---|
| | Rough working Rolling rate % | Finish working Rolling rate % | Mechanical surface treatment | Finish heat treatment Temper-ature ° C. | Finish heat treatment Time sec. | Thickness mm | Electrical conduc-tivity % IACS | Residual stress ratio % | Half-softening temperature ° C. | 0.2% yield strength MPa | Number of times of breaking times/10 |
| 1-4 | 70 | 20 | Buffing treatment | 370 | 15 | 5.0 | 99.2 | 64 | 325 | 264 | 0 |
| 1-5 | 60 | 80 | Buffing treatment | 360 | 30 | 2.0 | 98.8 | 26 | 324 | 367 | 0 |
| 1-6 | 80 | 70 | Buffing treatment | 360 | 30 | 1.0 | 98.5 | 66 | 322 | 369 | 0 |
| 1-7 | 70 | 40 | Buffing treatment | — | — | 5.0 | 98.3 | 29 | 326 | 315 | 0 |
| 1-8 | 80 | 40 | Tension leveler | 350 | 60 | 0.1 | 99.8 | 22 | 205 | 320 | 0 |
| 1-9 | 90 | 70 | Tension leveler | 280 | 10800 | 0.5 | 99.3 | 45 | 231 | 388 | 0 |
| 1-10 | 80 | 60 | Tension leveler | 340 | 120 | 0.1 | 99.3 | 65 | 279 | 364 | 0 |
| 1-11 | 80 | 20 | Tension leveler | 360 | 30 | 0.5 | 99.0 | 64 | 323 | 280 | 0 |
| 1-12 | 90 | 15 | Tension leveler | 360 | 30 | 0.5 | 98.9 | 64 | 326 | 228 | 8 |
| 1-13 | 90 | 40 | Tension leveler | 320 | 600 | 0.5 | 98.5 | 58 | 328 | 300 | 0 |
| 1-14 | 90 | 15 | Tension leveler | 370 | 15 | 0.5 | 98.4 | 65 | 324 | 242 | 0 |
| 1-15 | 90 | 70 | Tension leveler | — | — | 0.1 | 97.1 | 31 | 330 | 389 | 0 |

TABLE 4

| | | Producing step | | | | | | Evaluation | | | | | |
|---|---|---|---|---|---|---|---|---|---|---|---|---|---|
| | | Rough working Rolling rate % | Finish working Rolling rate % | Mechanical surface treatment | Finish heat treatment Temper-ature ° C. | Finish heat treatment Time sec. | Thickness mm | Electrical conduc-tivity % IACS | Residual stress ratio % | Half-softening temperature ° C. | 0.2% yield strength MPa | Number of times of breaking times/10 |
| Invention Examples | 1-16 | 70 | 40 | Light rolling | — | — | 5.0 | 99.8 | 23 | 207 | 309 | 0 |
| | 1-17 | 80 | 50 | Light rolling | 400 | 10 | 2.0 | 99.7 | 42 | 229 | 342 | 0 |
| | 1-18 | 90 | 20 | Light rolling | 350 | 60 | 0.1 | 99.5 | 65 | 278 | 250 | 7 |
| | 1-19 | 80 | 70 | Light rolling | 350 | 60 | 0.5 | 99.0 | 57 | 325 | 365 | 0 |
| | 1-20 | 60 | 15 | Light rolling | 350 | 60 | 10.0 | 99.0 | 65 | 324 | 217 | 0 |
| | 1-21 | 60 | 20 | Light rolling | 390 | 5 | 5.0 | 98.5 | 64 | 326 | 250 | 8 |
| | 1-22 | 80 | 50 | Light rolling | 360 | 30 | 0.8 | 98.5 | 67 | 324 | 342 | 0 |
| | 1-23 | 90 | 80 | Light rolling | 360 | 30 | 0.1 | 97.6 | 66 | 329 | 398 | 0 |
| Comparative Example | 1-1 | 80 | 20 | Buffing treatment | 360 | 30 | 0.5 | 99.9 | 12 | 175 | 248 | 0 |
| | 1-2 | 80 | 50 | Buffing treatment | 350 | 60 | 0.5 | 83.0 | 82 | 405 | 342 | 0 |
| | 1-3 | 90 | 40 | Light rolling | 360 | 30 | 1.0 | 99.7 | 16 | 321 | 310 | 0 |
| | 1-4 | 80 | 80 | Light rolling | 350 | 60 | 0.1 | 99.9 | 15 | 204 | 386 | 0 |

In Comparative Example 1-1, since the amount of Mg was less than the range of the first embodiment, the residual stress ratio was low, and the stress relaxation resistance was insufficient.

In Comparative Example 1-2, since the amount of Mg was greater than the range of the first embodiment, the electrical conductivity was low.

In Comparative Example 1-3, the total amount of S, P, Se, Te, Sb, Bi, and As was greater than 30 mass ppm, and thus the residual stress ratio was low, and the stress relaxation resistance was insufficient.

In Comparative Example 1-4, since the mass ratio [Mg]/[S+P+Se+Te+Sb+Bi+As] was less than 0.6, the residual stress ratio was low, and the stress relaxation resistance was insufficient.

On the contrary, in Invention Examples 1-1 to 1-23, it was confirmed that the electrical conductivity and the stress relaxation resistance were improved in a well-balanced manner. Further, the workability was also excellent.

As described above, according to Invention Examples, it was confirmed that a copper alloy having high electrical conductivity, excellent stress relaxation resistance, and excellent workability can be provided.

Example 2

Hereinafter, results of a verification test conducted to verify the effects of the second embodiment will be described.

A raw material consisting of pure copper having a purity of 99.999% by mass or greater which had been obtained by a zone melting refining method was charged into a high-purity graphite crucible and subjected to high-frequency induction melting in an Ar gas atmosphere furnace.

A base alloy containing 0.1% by mass of various additive elements was prepared by using a high-purity copper with 6N (purity of 99.9999% by mass) or greater and a pure metal with 2N (purity of 99% by mass) or greater. An ingot having the component composition listed in Tables 5 and 6 was produced by adding the base alloy to the obtained molten copper to adjust the component and pouring the molten copper into a heat insulating material (refractory material) mold. Further, the size of the ingot was set such that the thickness was approximately 30 mm, the width was approximately 60 mm, and the length was approximately in a range of 150 to 200 mm.

The obtained ingot was heated at 900° C. for 1 hour in an Ar gas atmosphere in order to solutionize Mg, and the surface was ground to remove the oxide film, and the ingot was cut into a predetermined size.

Thereafter, the thickness of the ingot was appropriately adjusted to obtain the final thickness, and the ingot was cut. Each of the cut specimens was subjected to rough rolling under the conditions listed in Tables 7 and 8. Next, an intermediate heat treatment was performed under the condition that the crystal grain size was set to approximately 30 μm by recrystallization.

Next, finish rolling (finish working step) was performed under the conditions listed in Tables 7 and 8.

Next, these specimens were subjected to a mechanical surface treatment step by the method listed in Tables 7 and 8.

Further, sandpaper polishing was performed using #240 abrasive paper.

A lapping treatment was performed using SiC-based abrasive grains and cast iron lapping.

The shot peening treatment was performed at a projection speed of 10 m/see for a projection time of 5 seconds using a stainless steel shot having a diameter of 0.2 mm. Thereafter, a finish heat treatment was performed under the conditions listed in Tables 7 and 8 to produce a strip material having a thickness listed in Tables 7 and 8 and a width of approximately 60 mm.

The obtained strip materials were evaluated for the following items.

(Composition Analysis)

A measurement specimen was collected from the obtained ingot, the amount of

Mg was measured by inductively coupled plasma atomic emission spectrophotometry, and the amounts of other elements were measured using a glow discharge mass spectrometer (GD-MS). Further, the measurement was performed at two sites, the center portion of the specimen and the end portion of the specimen in the width direction, and the larger amount was defined as the amount of the sample. As a result, it was confirmed that the component compositions were as listed in Tables 5 and 6.

(Electrical Conductivity)

Test pieces having a width of 10 mm and a length of 60 mm were collected from each strip material for characteristic evaluation and the electric resistance was acquired according to a 4 terminal method. Further, the dimension of each test piece was measured using a micrometer and the volume of the test piece was calculated. Then, the electrical conductivity was calculated from the measured electric resistance value and volume. Further, the test pieces were collected such that the longitudinal directions thereof were parallel to the rolling direction of each strip material for characteristic evaluation. The evaluation results are listed in Tables 7 and 8.

(Kam Value)

The average value of the KAM values was acquired in the following manner by using the rolled surface, that is, the normal direction (ND) surface as an observation surface with an EBSD measuring device and OIM analysis software.

Mechanical polishing was performed using waterproof abrasive paper and diamond abrasive grains. Next, finish polishing was performed using a colloidal silica solution. Thereafter, the observation surface was measured in a measurement area of 10000 $\mu m^2$ or greater at every measurement interval of 0.25 μm at an electron beam acceleration voltage of 15 kV by an EBSD method using an EBSD measuring device (Quanta FEG 450, manufactured by FEI, OIM Data Collection, manufactured by EDAX/TSL (currently AMETEK)) and analysis software (OIM Data Analysis ver. 7.3.1, manufactured by EDAX/TSL (currently AMETEK)). The measured results were analyzed by the data analysis software OIM to obtain CI values at each measurement point. The measurement points in which the CI value was 0.1 or less were removed, and the orientation difference between crystal grains was analyzed by the data analysis software OIM. A boundary having 15° or greater of an orientation difference between neighboring measurement points was assigned as a crystal grain boundary. The average grain size A was acquired according to Area Fraction using the data analysis software OIM. Thereafter, the observation surface was measured at every measurement interval which was 1/10 or less of the average grain size A by the EBSD method. The measured results were analyzed by the data analysis software OIM in a measurement area where the total area of a plurality of visual fields was 10000 $\mu m^2$ or greater such that a total of 1000 or more crystal grains were included, to obtain a CI value at each measurement point. The measurement points in which the CI value was 0.1 or less were removed, and the orientation difference between crystal grains was analyzed by the data analysis software OIM. The boundary having 5° or greater of an orientation difference between neighboring pixels (measurement points) was assigned as a crystal grain boundary, and the measurement results were analyzed. Next, the KAM values of all pixels were acquired, and the average value thereof was acquired.

(Stress Relaxation Resistance)

A stress relaxation resistance test was carried out by loading a stress using a method in conformity with a cantilever screw type in JCBA-T309:2004 of Japan Copper and Brass Association and the residual stress ratio after holding at a temperature of 200° C. for 4 hours was measured. The evaluation results are listed in Tables 7 and 8.

According to the test method, test pieces (width of 10 mm) were collected in a direction parallel to the rolling direction from each strip material for characteristic evaluation, the initial deflection displacement was set to 2 mm such that the maximum surface stress of each test piece was 80% of the yield strength, and the span length was adjusted. The maximum surface stress was determined according to the following equation.

Maximum surface stress (MPa)$=1.5Et\delta_0/L_s^2$

Each symbol represents the following value.

E: Young's modulus (MPa)

t: thickness (mm) of specimen $\delta_0$: initial deflection displacement (mm)

$L_s$: span length (mm)

Further, the yield strength used here was acquired by collecting #13B test pieces specified in JIS Z 2241 from each strip material for characteristic evaluation and measuring the 0.2% yield strength by the offset method in conformity with JIS Z 2241.

The residual stress ratio RSG (%) was measured based on the bending habit after holding at a temperature of 200° C. for 4 hours and the stress relaxation resistance was evaluated. Further, the residual stress ratio RSG (%) was calculated using the following equation.

Residual stress ratio RSG (%)$=(1-\delta_t/\delta_0)\times 100$

Each symbol represents the following value.

$\delta_t$: (permanent deflection displacement (mm) after holding at 200° C. for 4 hours)−(permanent deflection displacement (mm) after holding at room temperature for 24 hours)

$\delta_0$: initial deflection displacement (mm)

(Mechanical Characteristics)

#13B test pieces specified in JIS Z 2241 were collected from each strip material for characteristic evaluation and the tensile strength was measured according to the offset method in conformity with JIS Z 2241. Further, the test pieces were collected in a direction parallel to the rolling direction. The evaluation results are listed in Tables 7 and 8.

TABLE 5

| | | Component composition (mass ratio) | | | | | | | | | | [S + P + Se + Te + Sb + Bi + As] ppm | [Mg]/[S + P + Se + Te + Sb + Bi + As] |
|---|---|---|---|---|---|---|---|---|---|---|---|---|---|
| | | | | Impurities | | | | | | | | | |
| | | Mg ppm | Ag ppm | S ppm | P ppm | Se ppm | Te ppm | Sb ppm | Bi ppm | As ppm | Cu | | |
| Invention Examples | 2-1 | 11 | 13.0 | 4.1 | 2.8 | 0.8 | 0.5 | 0.6 | 0.4 | 0.6 | Balance | 9.8 | 1.1 |
| | 2-2 | 23 | 19.0 | 5.0 | 6.6 | 2.1 | 2.6 | 2.1 | 2.1 | 2.3 | Balance | 22.8 | 1.0 |
| | 2-3 | 39 | 18.0 | 2.5 | 3.2 | 0.2 | 0.4 | 0.4 | 0.4 | 0.3 | Balance | 7.4 | 5.3 |
| | 2-4 | 46 | 13.0 | 7.1 | 7.2 | 3.2 | 3.1 | 3.2 | 2.9 | 3.2 | Balance | 29.9 | 1.5 |
| | 2-5 | 59 | 12.0 | 4.6 | 3.4 | 2.4 | 2.6 | 3.6 | 2.2 | 4.0 | Balance | 22.8 | 2.6 |
| | 2-6 | 69 | 11.0 | 3.5 | 4.5 | 4.0 | 3.7 | 1.3 | 1.6 | 1.3 | Balance | 19.9 | 3.5 |
| | 2-7 | 81 | 5.0 | 0.6 | 0.6 | 0.3 | 0.3 | 0.2 | 0.2 | 0.2 | Balance | 2.4 | 33.8 |
| | 2-8 | 99 | 5.0 | 0.4 | 0.4 | 0.3 | 0.3 | 0.2 | 0.2 | 0.2 | Balance | 2.0 | 49.5 |
| | 2-9 | 11 | 17.0 | 4.2 | 4.1 | 1.8 | 1.9 | 1.7 | 1.5 | 1.9 | Balance | 17.1 | 0.6 |
| | 2-10 | 24 | 16.0 | 4.3 | 4.2 | 2.8 | 2.4 | 2.8 | 2.4 | 2.3 | Balance | 21.2 | 1.1 |
| | 2-11 | 37 | 11.0 | 3.5 | 5.0 | 2.4 | 2.4 | 2.7 | 2.7 | 2.9 | Balance | 21.6 | 1.7 |
| | 2-12 | 49 | 8.0 | 1.2 | 2.4 | 0.5 | 0.4 | 0.6 | 0.8 | 0.3 | Balance | 6.2 | 7.9 |
| | 2-13 | 55 | 0.0 | 4.5 | 5.1 | 2.4 | 2.5 | 2.4 | 2.3 | 2.3 | Balance | 21.5 | 2.6 |
| | 2-14 | 71 | 15.0 | 2.1 | 2.8 | 0.5 | 0.4 | 0.6 | 0.4 | 0.1 | Balance | 6.9 | 10.3 |
| | 2-15 | 86 | 12.0 | 2.1 | 2.3 | 0.2 | 0.6 | 0.2 | 0.2 | 0.2 | Balance | 5.8 | 14.8 |
| | 2-16 | 98 | 5.0 | 0.6 | 0.8 | 0.1 | 0.1 | 0.2 | 0.1 | 0.1 | Balance | 2.0 | 49.0 |

TABLE 6

| | | Component composition (mass ratio) | | | | | | | | | | [S + P + Se + Te + Sb + Bi + As] ppm | [Mg]/[S + P + Se + Te + Sb + Bi + As] |
|---|---|---|---|---|---|---|---|---|---|---|---|---|---|
| | | | | Impurities | | | | | | | | | |
| | | Mg ppm | Ag ppm | S ppm | P ppm | Se ppm | Te ppm | Sb ppm | Bi ppm | As ppm | Cu | | |
| Invention Examples | 2-17 | 11 | 15.0 | 2.7 | 3.5 | 1.1 | 1.4 | 1.6 | 1.2 | 1.6 | Balance | 13.1 | 0.8 |
| | 2-18 | 20 | 12.0 | 3.6 | 3.4 | 1.2 | 1.6 | 1.5 | 1.8 | 1.8 | Balance | 14.9 | 1.3 |
| | 2-19 | 45 | 16.0 | 3.1 | 3.4 | 2.4 | 2.8 | 2.8 | 3.1 | 2.3 | Balance | 19.9 | 2.3 |
| | 2-20 | 58 | 9.0 | 0.5 | 0.5 | 0.4 | 0.3 | 0.3 | 0.3 | 0.3 | Balance | 2.6 | 22.3 |
| | 2-21 | 75 | 4.0 | 4.5 | 5.1 | 3.7 | 3.4 | 3.5 | 3.4 | 2.9 | Balance | 26.5 | 2.8 |
| | 2-22 | 82 | 16.0 | 7.2 | 6.4 | 3.5 | 3.1 | 3.2 | 3.3 | 3.2 | Balance | 29.9 | 2.7 |
| | 2-23 | 99 | 12.0 | 3.6 | 4.0 | 2.1 | 2.4 | 1.9 | 1.8 | 1.2 | Balance | 17.0 | 5.8 |
| Comparative Examples | 2-1 | 9 | 15.0 | 2.5 | 2.3 | 0.5 | 0.5 | 0.6 | 0.7 | 0.6 | Balance | 7.7 | 1.2 |
| | 2-2 | 2341 | 18.0 | 4.6 | 4.9 | 2.4 | 2.1 | 2.9 | 2.4 | 2.6 | Balance | 21.9 | 107.1 |
| | 2-3 | 43 | 18.0 | 7.8 | 7.9 | 4.5 | 4.1 | 4.3 | 4.3 | 4.2 | Balance | 37.1 | 1.2 |

TABLE 6-continued

| | Component composition (mass ratio) Mg ppm | Ag ppm | Impurities S ppm | P ppm | Se ppm | Te ppm | Sb ppm | Bi ppm | As ppm | Cu | [S + P + Se + Te + Sb + Bi + As] ppm | [Mg]/[S + P + Se + Te + Sb + Bi + As] |
|---|---|---|---|---|---|---|---|---|---|---|---|---|
| 2-4 | 12 | 12.0 | 5.5 | 5.4 | 3.1 | 3.4 | 3.5 | 3.5 | 3.1 | Balance | 27.5 | 0.4 |
| 2-5 | 72 | 13.0 | 4.0 | 3.8 | 0.9 | 0.8 | 0.4 | 0.4 | 0.8 | Balance | 11.1 | 6.5 |

TABLE 7

| | | Producing step: Rough working Rolling rate % | Finish working Rolling rate % | Mechanical surface treatment | Finish heat treatment Temperature ° C. | Time sec. | Thickness mm | Evaluation: Electrical conductivity % IACS | Residual stress ratio % | Tensile strength MPa | KAM average value |
|---|---|---|---|---|---|---|---|---|---|---|---|
| Invention Examples | 2-1 | 90 | 15 | Shot peening treatment | 360 | 30 | 2.0 | 99.7 | 23 | 301 | 1.6 |
| | 2-2 | 80 | 70 | Shot peening treatment | 390 | 5 | 1.0 | 99.3 | 35 | 390 | 2.3 |
| | 2-3 | 90 | 30 | Shot peening treatment | 250 | 180000 | 0.5 | 98.3 | 65 | 327 | 2.1 |
| | 2-4 | 60 | 20 | Shot peening treatment | 370 | 15 | 8.0 | 99.2 | 27 | 315 | 1.9 |
| | 2-5 | 80 | 10 | Shot peening treatment | 370 | 15 | 5.0 | 99.0 | 63 | 295 | 1.2 |
| | 2-6 | 90 | 40 | Shot peening treatment | 350 | 60 | 0.1 | 98.4 | 66 | 345 | 2.2 |
| | 2-7 | 60 | 30 | Shot peening treatment | 390 | 5 | 8.0 | 99.2 | 67 | 328 | 2.2 |
| | 2-8 | 60 | 10 | Shot peening treatment | 390 | 5 | 10.0 | 97.8 | 65 | 298 | 1.6 |
| | 2-9 | 90 | 20 | Lapping treatment | 360 | 30 | 1.0 | 99.8 | 24 | 312 | 1.8 |
| | 2-10 | 70 | 30 | Lapping treatment | 350 | 60 | 5.0 | 99.2 | 37 | 325 | 2.1 |
| | 2-11 | 80 | 50 | Lapping treatment | 370 | 15 | 2.0 | 99.1 | 65 | 361 | 2.2 |
| | 2-12 | 90 | 80 | Lapping treatment | 250 | 180000 | 0.1 | 99.0 | 64 | 407 | 2.3 |
| | 2-13 | 50 | 20 | Lapping treatment | 390 | 5 | 10.0 | 98.9 | 52 | 317 | 2.0 |
| | 2-14 | 90 | 0 | Lapping treatment | 350 | 60 | 1.0 | 98.6 | 75 | 271 | 0.2 |
| | 2-15 | 90 | 40 | Lapping treatment | 350 | 60 | 0.1 | 98.3 | 65 | 347 | 2.2 |
| | 2-16 | 60 | 10 | Lapping treatment | 370 | 15 | 8.0 | 98.2 | 65 | 297 | 1.5 |

TABLE 8

| | | Producing step: Rough working Rolling rate % | Finish working Rolling rate % | Mechanical surface treatment | Finish heat treatment Temperature ° C. | Time sec. | Thickness mm | Evaluation: Electrical conductivity % IACS | Residual stress ratio % | Tensile strength MPa | KAM average value |
|---|---|---|---|---|---|---|---|---|---|---|---|
| Invention Examples | 2-17 | 90 | 5 | Sandpaper polishing | 390 | 5 | 2.0 | 99.9 | 26 | 285 | 0.8 |
| | 2-18 | 90 | 70 | Sandpaper polishing | 350 | 60 | 0.1 | 99.4 | 39 | 389 | 2.3 |
| | 2-19 | 90 | 80 | Sandpaper polishing | 390 | 5 | 0.5 | 99.5 | 64 | 405 | 2.3 |
| | 2-20 | 90 | 2 | Sandpaper polishing | 250 | 180000 | 0.1 | 98.7 | 69 | 283 | 2.4 |
| | 2-21 | 50 | 60 | Sandpaper polishing | 370 | 15 | 5.0 | 97.2 | 22 | 378 | 2.3 |

TABLE 8-continued

| | | Producing step | | | | | | Evaluation | | | |
|---|---|---|---|---|---|---|---|---|---|---|---|
| | | Rough working | Finish working | Mechanical | Finish heat treatment | | | Electrical | Residual | Tensile | KAM |
| | | Rolling rate % | Rolling rate % | surface treatment | Temperature ° C. | Time sec. | Thickness mm | conductivity % IACS | stress ratio % | strength MPa | average value |
| | 2-22 | 50 | 40 | Sandpaper polishing | 360 | 30 | 8.0 | 98.5 | 29 | 346 | 2.2 |
| | 2-23 | 90 | 5 | Sandpaper polishing | 390 | 5 | 0.1 | 98.4 | 68 | 286 | 0.9 |
| Comparative Example | 2-1 | 50 | 60 | Shot peening treatment | 370 | 15 | 5.0 | 99.9 | 18 | 375 | 2.2 |
| | 2-2 | 90 | 20 | Lapping treatment | 250 | 180000 | 0.5 | 83.1 | 81 | 378 | 2.3 |
| | 2-3 | 60 | 10 | Lapping treatment | 360 | 30 | 10.0 | 98.4 | 16 | 294 | 1.1 |
| | 2-4 | 90 | 20 | Sandpaper polishing | 350 | 60 | 2.0 | 99.1 | 15 | 313 | 1.8 |
| | 2-5 | 60 | 99 | Sandpaper polishing | 360 | 30 | 0.1 | 98.6 | 17 | 445 | 2.7 |

In Comparative Example 2-1, since the amount of Mg was less than the range of the second embodiment, the residual stress ratio was low, and the stress relaxation resistance was insufficient.

In Comparative Example 2-2, the amount of Mg was greater than the range of the second embodiment, and thus the electrical conductivity was low.

In Comparative Example 2-3, since the total amount of S, P, Se, Te, Sb, Bi, and As was greater than 30 mass ppm, the residual stress ratio was low, and the stress relaxation resistance was insufficient.

In Comparative Example 2-4, since the mass ratio [Mg]/[S+P+Se+Te+Sb+Bi+As] was less than 0.6, the residual stress ratio was low, and the stress relaxation resistance was insufficient.

In Comparative Example 2-5, since the average value of the KAM values was greater than 2.4, the residual stress ratio was low, and the stress relaxation resistance was insufficient.

On the contrary, in Invention Examples 2-1 to 2-23, it was confirmed that the electrical conductivity and the stress relaxation resistance were improved in a well-balanced manner.

INDUSTRIAL APPLICABILITY

The copper alloy (plastically-worked copper alloy material) of the present embodiment is suitably applied to a component for electronic/electrical devices such as a terminal, a bus bar, a lead frame, or a heat dissipation substrate.

What is claimed is:

1. A copper alloy comprising:

Mg in an amount of greater than 10 mass ppm and less than 100 mass ppm;

Ag in an amount of 5 mass ppm or greater and 20 mass ppm or less; and a balance being Cu and inevitable impurities, wherein the inevitable impurities comprise;

S in an amount of 10 mass ppm or less,

P in an amount of 10 mass ppm or less,

Se in an amount of 5 mass ppm or less,

Te in an amount of 5 mass ppm or less,

Sb in an amount of 5 mass ppm or less,

Bi in an amount of 5 mass ppm or less, and

As in an amount of 5 mass ppm or less, a total amount of S, P, Se, Te, Sb, Bi, and As is 30 mass ppm or less, and when the amount of Mg is represented as [Mg] and the total amount of S, P, Se, Te, Sb, Bi, and As is represented as [S+P+Se+Te+Sb+Bi+As], a mass ratio thereof, [Mg]/[S+P+Se+Te+Sb+Bi+As] is 0.6 or greater and 50 or less, an electrical conductivity is 98.0% IACS or greater, a residual stress ratio in a direction parallel to a rolling direction at 150° C. for 1000 hours is 20% or greater, and a half-softening temperature is 200° C. or higher.

2. The copper alloy according to claim 1, wherein the inevitable impurities further comprise;

H in an amount of 10 mass ppm or less,

O in an amount of 100 mass ppm or less, and

C in an amount of 10 mass ppm or less.

3. The copper alloy according to claim 1, wherein in a case where the copper alloy is measured by an EBSD method in a measurement area of 10000 $\mu m^2$ or greater at every measurement interval of 0.25 μm, measured results are analyzed by data analysis software OIM to obtain a CI value at each measurement point, a measurement point at which the CI value is 0.1 or less is removed, an orientation difference between crystal grains is analyzed, a boundary having 15° or greater of an orientation difference between neighboring measurement points is assigned as a crystal grain boundary, an average grain size A is acquired according to Area Fraction, the copper alloy is measured by the EBSD method at every measurement interval which is 1/10 or less of the average grain size A, measured results are analyzed by the data analysis software OIM with a total area of 10000 $\mu m^2$ or greater in a plurality of visual fields such that a total of 1000 or more crystal grains are included to obtain a CI value at each measurement point, a measurement point at which the CI value is 0.1 or less is removed, an orientation difference between crystal grains is analyzed, and a boundary having 5° or greater of an orientation difference between neighboring pixels is assigned as a crystal grain boundary, an average value of Kernel Average Misorientation (KAM) values is 2.4 or less.

4. A copper alloy comprising:

Mg in an amount of greater than 10 mass ppm and less than 100 mass ppm;

Ag in an amount of 5 mass ppm or greater and 20 mass ppm or less; and a balance being Cu and inevitable impurities, wherein the inevitable impurities comprise;

S in an amount of 10 mass ppm or less,
P in an amount of 10 mass ppm or less,
Se in an amount of 5 mass ppm or less,
Te in an amount of 5 mass ppm or less,
Sb in an amount of 5 mass ppm or less,
Bi in an amount of 5 mass ppm or less, and
As in an amount of 5 mass ppm or less, a total amount of S, P, Se, Te, Sb, Bi, and As is 30 mass ppm or less, when the amount of Mg is represented as [Mg] and the total amount of S, P, Se, Te, Sb, Bi, and As is represented as [S+P+Se+Te+Sb+Bi+As], a mass ratio thereof, [Mg]/[S+P +Se+Te+Sb+Bi+As] is 0.6 or greater and 50 or less, an electrical conductivity is 98.0% IACS or greater, a residual stress ratio RSG (%) in a direction parallel to a rolling direction after holding at 200° C. for 4 hours is 20% or greater, a half-softening temperature is 200° C. or higher, and in a case where the copper alloy is measured by an EBSD method in a measurement area of 10000 $\mu m^2$ or greater at every measurement interval of 0.25 μm, measured results are analyzed by data analysis software OIM to obtain a CI value at each measurement point, a measurement point at which the CI value is 0.1 or less is removed, an orientation difference between crystal grains is analyzed, a boundary having 15° or greater of an orientation difference between neighboring measurement points is assigned as a crystal grain boundary, an average grain size A is acquired according to Area Fraction, the copper alloy is measured by the EBSD method at every measurement interval which is 1/10 or less of the average grain size A, measured results are analyzed by the data analysis software OIM with a total area of 10000 $\mu m^2$ or greater in a plurality of visual fields such that a total of 1000 or more crystal grains are included to obtain a CI value at each measurement point, a measurement point at which the CI value is 0.1 or less is removed, an orientation difference between crystal grains is analyzed, and a boundary having 5° or greater of an orientation difference between neighboring pixels is assigned as a crystal grain boundary, an average value of Kernel Average Misorientation (KAM) values is 2.4 or less.

5. A plastically-worked copper alloy material comprising: the copper alloy according to claim 1.

6. The plastically-worked copper alloy material according to claim 5, wherein the plastically-worked copper alloy material is a rolled plate having a thickness of 0.1 mm or greater and 10 mm or less.

7. The plastically-worked copper alloy material according to claim 5, wherein the plastically-worked copper alloy material includes a Sn plating layer or an Ag plating layer on a surface thereof.

8. A component for electronic/electrical devices, comprising:

the plastically-worked copper alloy material according to claim 5.

9. A terminal comprising:

the plastically-worked copper alloy material according to claim 5.

10. A bus bar comprising:

the plastically-worked copper alloy material according to claim 5.

11. A lead frame comprising:

the plastically-worked copper alloy material according to claim 5.

12. A heat dissipation substrate which is prepared by using the copper alloy according to claim 1.

* * * * *